(12) United States Patent
Yasini et al.

(10) Patent No.: US 12,366,451 B2
(45) Date of Patent: Jul. 22, 2025

(54) METHODS AND APPARATUS FOR MONITORING A KINEMATIC STATE OF AN UNMANNED AERIAL VEHICLE

(71) Applicant: Telefonaktiebolaget LM Ericsson (publ), Stockholm (SE)

(72) Inventors: Sholeh Yasini, Sundbyberg (SE); Torbjörn Wigren, Uppsala (SE); Richard Wirén, Vantaa (FI); Juhani Kauppi, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 331 days.

(21) Appl. No.: 17/785,342

(22) PCT Filed: Dec. 20, 2019

(86) PCT No.: PCT/SE2019/051335
§ 371 (c)(1),
(2) Date: Jun. 14, 2022

(87) PCT Pub. No.: WO2021/126036
PCT Pub. Date: Jun. 24, 2021

(65) Prior Publication Data
US 2023/0020638 A1 Jan. 19, 2023

(51) Int. Cl.
*G01C 21/16* (2006.01)
*H04B 7/185* (2006.01)

(52) U.S. Cl.
CPC ......... *G01C 21/16* (2013.01); *H04B 7/18504* (2013.01)

(58) Field of Classification Search
CPC ..................................................... G01C 21/16
See application file for complete search history.

(56) References Cited

U.S. PATENT DOCUMENTS 9,743,254 B2 * 8/2017 Friday ................. H04B 17/318
10,484,892 B2 * 11/2019 Bellamkonda ...... H04L 41/0823
(Continued)

FOREIGN PATENT DOCUMENTS

| WO | 2018175252 A1 | 9/2018 |
| WO | 2019199211 A1 | 10/2019 |
| WO | 2019240550 A1 | 12/2019 |

OTHER PUBLICATIONS

International Search Report and Written Opinion of the International Searching Authority for PCT International Application No. PCT/SE2019/051335 dated Aug. 12, 2020.
Communication Regarding Extended European Search Report for European Patent Application No. 19956829.6 dated Sep. 26, 2023, 15 pages.
(Continued)

*Primary Examiner* — Michael A Berns
(74) *Attorney, Agent, or Firm* — Sage Patent Group

(57) ABSTRACT

A method of monitoring a kinematic state of an unmanned aerial vehicle (UAV) is provided. The method comprises obtaining one or more predicted pathlosses between a UAV and one or more base stations at a first time instance, wherein the predicted pathlosses are determined using an estimate of a kinematic state of the UAV at the first time instance and one or more pathloss models developed using a machine-learning process. The method further comprises obtaining one or more measurements of a pathloss between each of the one or more base stations and the UAV at the first time instance, and re-determining the estimate of the kinematic state of the UAV at the first time instance based on the one or more predicted pathlosses and the one or more measurements of the pathloss.

19 Claims, 13 Drawing Sheets

(56) References Cited

U.S. PATENT DOCUMENTS

| | | | | |
|---|---|---|---|---|
| 10,567,057 | B2* | 2/2020 | Park | H04L 5/0023 |
| 11,422,253 | B2* | 8/2022 | Mahmoud | G01S 7/41 |
| 11,582,581 | B2* | 2/2023 | Rydén et al. | H04B 7/18506 |
| 11,703,853 | B2* | 7/2023 | Hong | G08G 5/0034 |
| | | | | 701/3 |
| 11,784,691 | B2* | 10/2023 | Agrawal | H04B 7/0617 |
| | | | | 375/267 |
| 11,979,851 | B2* | 5/2024 | Yasini | G01S 11/10 |
| 2019/0261197 | A1 | 8/2019 | Bellamkonda et al. | |
| 2019/0385379 | A1 | 12/2019 | Woo | |
| 2022/0357939 | A1* | 11/2022 | Ward | G16Y 30/00 |
| 2022/0390545 | A1* | 12/2022 | Yasini | G01S 5/0294 |
| 2023/0020638 | A1* | 1/2023 | Yasini | G01S 5/0278 |
| 2023/0341505 | A1* | 10/2023 | Wigren | G01S 5/0294 |

OTHER PUBLICATIONS

Faruk, Nasir et al., "Path Loss Predictions in the VHF and UHF Bands Within Urban Environments: Experimental Investigation of Empirical, Heuristics and Geospatial Models", IEEE Access, vol. 7, Jun. 2019, pp. 77293-77307.

Partial Supplementary European Search Report for European Patent Application No. 19956829.6 dated Aug. 2, 2023, 3 pages.

Chunbo Luo et al., "UAV Position Estimation and Collision Avoidance Using the Extended Kalman Filter," IEEE Transactions on Vehicular Technology, vol. 62, No. 6, Jul. 2013, pp. 2749-2762.

Guanshu Yang et al., "Machine-learning-based prediction methods for path loss and delay spread in air-to-ground millimetre-wave channels," IET Microwaves, Antennas & Propagation, IET Journals (The Institution of Engineering and Technology), United Kingdom, vol. 13, No. 8, Apr. 18, 2019, pp. 1113-1121.

* cited by examiner

METHODS AND APPARATUS FOR MONITORING A KINEMATIC STATE OF AN UNMANNED AERIAL VEHICLE

CROSS REFERENCE TO RELATED APPLICATION

This application is a 35 U.S.C. § 371 national stage application of PCT International Application No. PCT/SE2019/051335 filed on Dec. 20, 2019, the disclosure and content of which is incorporated by reference herein in its entirety.

TECHNICAL FIELD

Aspects of the present disclosure relate to monitoring a kinematic state of an unmanned aerial vehicle.

BACKGROUND

Unmanned Aerial Vehicles (UAVs) are increasingly being used for a diverse range of applications. In the past, UAVs were required to stay within range of a dedicated radio controller equipment, drastically restricting their range. However, a UAV may now be provided with the capability to connect to base stations in a wireless communication network, which allows the UAV to travel over multiple cells in the network. When operated in this manner, the range of a UAV is effectively only limited by its battery.

Whilst this further diversifies the range of applications for which UAVs may be used, it may also create additional challenges. In particular, the increasing prevalence of UAVs may risk conflict occurring between UAVs and other airspace users (e.g. planes). In addition, as a result of their elevation, UAVs are more likely to have an uninterrupted line-of-sight to base stations and wireless devices, which means that UAVs may generate increased interference for other devices in the network.

In some jurisdictions, users are required to register UAVs configured to operate in this manner, which allows for regulating and monitoring the use of UAVs. In the absence of such registration, however, it can be difficult to monitor the movements of UAVs. Although various countermeasures exist for managing UAVs (e.g. restricting the movement of a UAV and/or mitigating additional interference caused by a UAV), many such countermeasures require knowledge of the position of the UAV.

SUMMARY

Aspects of the present disclosure seek to address these and other problems.

In one aspect, a method of monitoring a kinematic state of an unmanned aerial vehicle (UAV) is provided. The method comprises obtaining one or more predicted pathlosses between a UAV and one or more base stations at a first time instance, in which the predicted pathlosses are determined using an estimate of a kinematic state of the UAV at the first time instance and one or more pathloss models developed using a machine-learning process. The method further comprises obtaining one or more measurements of a pathloss between each of the one or more base stations and the UAV at the first time instance, and re-determining the estimate of the kinematic state of the UAV at the first time instance based on the one or more predicted pathlosses and the one or more measurements of the pathloss.

In a further aspect, the present disclosure provides an apparatus configured to perform the aforementioned method.

A still further aspect of the present disclosure provides an apparatus for monitoring a kinematic state of a UAV. The apparatus comprises a processor and a machine-readable medium, in which the machine-readable medium contains instructions executable by the processor such that the apparatus is operable to: obtain one or more predicted pathlosses between a UAV and one or more base stations at a first time instance, in which the predicted pathlosses are determined using an estimate of a kinematic state of the UAV at the first time instance and one or more pathloss models developed using a machine-learning process. The apparatus is further operable to obtain one or more measurements of a pathloss between each of the one or more base stations and the UAV at the first time instance, and re-determine the estimate of the kinematic state of the UAV at the first time instance based on the one or more predicted pathlosses and the one or more measurements of the pathloss.

In another aspect, a method of developing a pathloss model for determining a pathloss between a UAV and a base station is provided. The method comprises obtaining input data comprising a plurality of position measurements for one or more UAVs, and obtaining target data comprising a plurality of pathloss measurements for signals transmitted between the base station and the one or more UAVs. Each of the pathloss measurements is associated with a position measurement in the plurality of position measurements. The method further comprises using a machine-learning process to develop the pathloss model based on the input data and the target data, for determining a pathloss between the base station and a UAV.

In a further aspect, the present disclosure provides an apparatus configured to perform the aforementioned method.

A still further aspect of the present disclosure provides an apparatus for developing a pathloss model for determining a pathloss between a UAV and a base station. The apparatus comprises a processor and a machine-readable medium, in which the machine-readable medium contains instructions executable by the processor such that the apparatus is operable to: obtain input data comprising a plurality of position measurements for one or more UAVs and obtain target data comprising a plurality of pathloss measurements for signals transmitted between the base station and the one or more UAVs, in which each of the pathloss measurements is associated with a position measurement in the plurality of positions. The apparatus is further operable to use a machine-learning process to develop the pathloss model based on the input data and the target data, for determining a pathloss between the base station and a UAV.

By developing one or more pathloss models using a machine learning process, aspects of the present disclosure provide more accurate methods for estimating pathlosses between a UAV and a base station. Once trained, the pathloss models may require fewer computational resources to implement, which enables obtaining accurate pathloss estimates more efficiently. By using pathloss models developed using a machine learning process for kinematic state estimation, aspects of the disclosure thus provide methods, apparatus and machine-readable mediums for accurately and efficiently monitoring the kinematic state of UAVs using wireless communication networks.

BRIEF DESCRIPTION OF THE DRAWINGS

For a better understanding of aspects of the present disclosure, and to show more clearly how the examples may be carried into effect, reference will now be made, by way of example only, to the following drawings in which.

DETAILED DESCRIPTION

Figure 1:
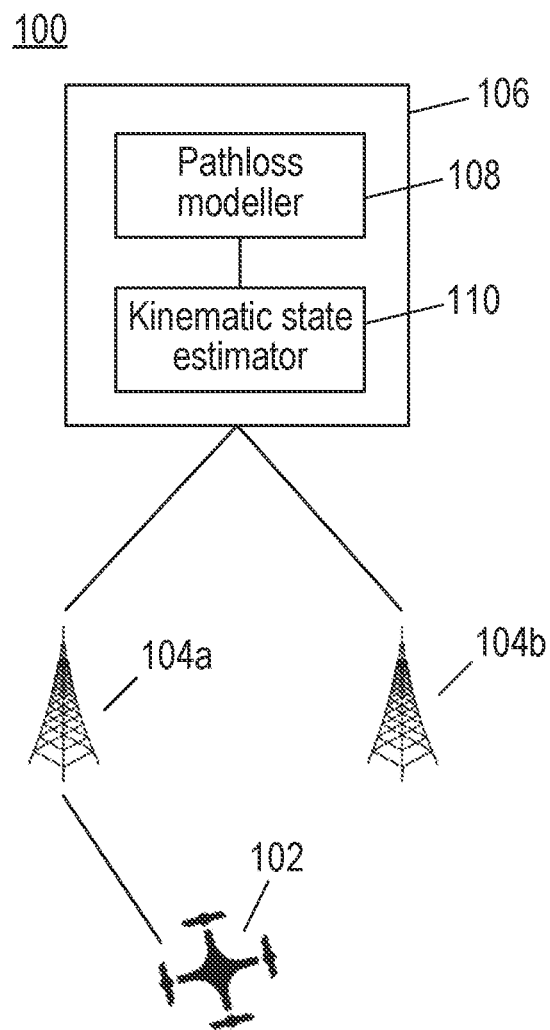
FIG. 1 shows a wireless communication network according to embodiments of the disclosure.

FIG. 1 shows a wireless communication network 100 according to embodiments of the disclosure. The wireless communication network 100 may implement any suitable wireless communications protocol or technology, such as Global System for Mobile communication (GSM), Wideband Code-Division Multiple Access (WCDMA), Long Term Evolution (LTE), New Radio (NR), WiFi, WiMAX, or Bluetooth wireless technologies. In one particular example, the network 100 forms part of a cellular telecommunication network, such as the type developed by the $3^{rd}$ Generation Partnership Project (3GPP). Those skilled in the art will appreciate that various components of the network 100 are omitted from FIG. 1 for the purposes of clarity.

The wireless communication network 100 comprises a first base station 104a and a second base station 104b. The first base station 104a is in radio communication with an unmanned aerial vehicle (UAV) 102, which has an integrated wireless device (such as a user equipment, mobile station, etc). The unmanned aerial vehicle is connected to a core network 106 via the base station 104a and a backhaul network (not illustrated). The first base station 104a may be, for example, the serving base station for the unmanned aerial vehicle 102. Although two base stations 104a, 104b (collectively, 104) are shown, the skilled person will appreciate that the network 100 may contain any number of base stations 104, and in one particular embodiment comprises three or more base stations.

Aspects of the disclosure provide methods, apparatus and machine-readable mediums for accurately and efficiently estimating a kinematic state of a UAV. In one aspect, a method of monitoring a kinematic state of a UAV is provided. An initial estimate of a kinematic state of the UAV at a first time instance is used with one or more pathloss models, developed using a machine-learning process, to predict one or more pathlosses between the UAV and one or more base stations at the first time instance. The kinematic state of the UAV at the first time instance is re-determined using the predicted pathlosses and one or more measurements of a pathloss between the UAV and each of the one or more base stations.

The method may be performed iteratively such that, for example, the initial estimate of the kinematic state of the UAV at the first time instance is itself determined based on an estimate of the kinematic state of the UAV at a second, earlier time instance. The kinematic state of the UAV may thus be monitored as it travels along a trajectory, at each of a plurality of time instances, by initially estimating the kinematic state of the UAV based on its previous kinematic state, and then updating the initial estimate based on pathloss measurements and predicted pathlosses.

According to aspects of the disclosure therefore, the kinematic state of a UAV 102 may be monitored by obtaining measurements of a pathloss between the UAV 102 and at least one of the base stations 104 and predicting a pathloss between the UAV 102 and at least one of the base stations 104 using pathloss models developed using a machine-learning process. In particular examples, the pathloss measurements may be determined based on received power measurements reported by the UAV 102 as part of legacy signalling procedures. By estimating the kinematic state using pathloss measurements, aspects of the disclosure therefore allow the state of a UAV 102 to be estimated, without requiring any additional signalling from the UAV 102.

Further, by using pathloss models developed using a machine learning process, embodiments of the disclosure allow more accurate pathloss predictions to be obtained, thereby increasing the accuracy of the kinematic state estimation.

This method may be performed by one of the one more base stations 104. In alternative embodiments, the method may be performed by one or more nodes in the core network 106, or connected to the core network 106.

In the illustrated example, the core network 106 comprises a pathloss modeller 108 and a kinematic state estimator 110. The pathloss modeller 108 obtains an initial estimate of the kinematic state of the UAV 102 (e.g., from the kinematic state estimator 110) and inputs the estimate of the kinematic state of the UAV 102 into one or more pathloss models to determine predicted pathlosses between the UAV 102 and one or more base stations 104.

The kinematic state estimator 110 receives the predicted pathlosses from the pathloss modeller 108. The kinematic state estimator 110 further obtains one or more measurements of a pathloss between each of the one or more base stations 104 and the UAV 102. For example, the kinematic state estimator 110 may receive the one or measurements from the base stations 104. The kinematic state estimator uses the predicted pathlosses (obtained from the pathloss modeller 108) and the pathloss measurements to re-determine the kinematic state estimate.

Thus in the illustrated embodiment, the pathloss modeller 108 and the kinematic state estimator 110 are implemented in separate nodes in the core network 106. In another example, the pathloss modeller 108 and the kinematic state estimator 110 are implemented in a single node in the core network 106.

Figure 2:
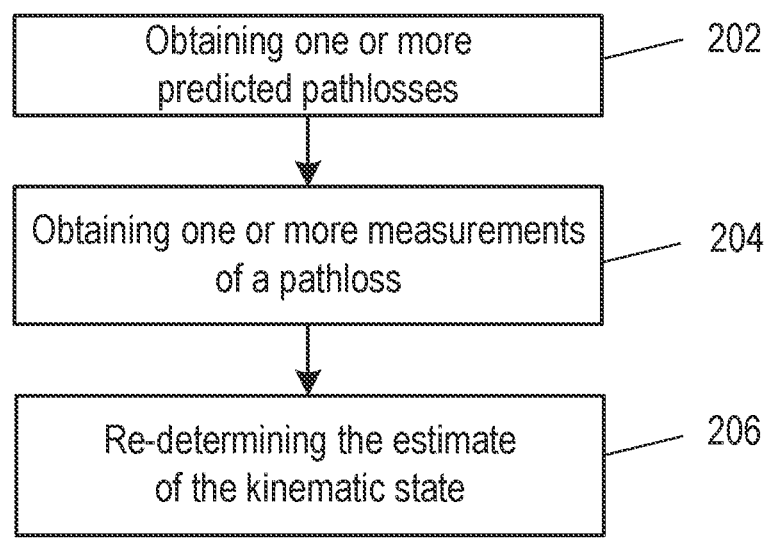
FIG. 2 is a flowchart of a method of monitoring a kinematic state of an unmanned aerial vehicle (UAV) according to embodiments of the disclosure.

FIG. 2 is a flowchart of a method 200 of monitoring a kinematic state of a UAV according to embodiments of the disclosure. The UAV may be, for example, the UAV 102 described above in respect of FIG. 1. The method 200 may be performed by one or more nodes in a wireless communications network. For example, the method 200 may be performed in a base station (e.g. the base station 104a described above in respect of FIG. 1) or one or more nodes in a core network or connected to a core network (e.g. the core network 106 described above in respect of FIG. 1).

As used herein, the kinematic state of a UAV at a particular time instance may comprise one or more of: a position of the UAV, a velocity of the UAV and an acceleration of the UAV at the particular time instance. Thus, for example, the kinematic state of a UAV may consist of a three-dimensional position of the UAV, a three-dimensional velocity of the UAV and a three-dimensional acceleration of the UAV.

The method begins in step 202, in which one or more predicted pathlosses between the UAV 102 and one or more base stations at a first time instance are obtained. The one or more base stations may be, for example, one or more of the base stations 104 described above in respect of FIG. 1. The one or more base stations may be, for example, any base station in communication with the UAV 102. In particular examples, the one or more base stations 104 may comprise a serving base station for the UAV 102 (e.g. the base station 104a) and one or more neighbouring base stations for the UAV 102 (e.g. the base station 104b).

The predicted pathlosses are determined using an estimate of a kinematic state of the UAV 102 at the first time instance and one or more pathloss models developed using a machine-learning process. In particular examples, each of the one or more pathloss models corresponds to a respective base station of the one or more base stations. That is, each pathloss model may be specific to a particular base station in the one or more base stations. Alternatively, the one or more pathloss models may be suitable for more than one base station, or any base station. Thus, for example, the one or more pathloss models may consist of a single pathloss model that is suitable for any base station.

The development of the one or more pathloss models is described in more detail below with respect to FIGS. 3-7.

Step 202 may comprise obtaining the estimate of the kinematic state of the UAV at the first time instance and inputting the estimate of the kinematic state of the UAV at the first time instance into the one or more pathloss models to determine the one or more predicted pathlosses. That is, a first estimate of the kinematic state of the UAV 102 at the first time instance may be obtained and then used to predict the one or more predicted pathlosses of the UAV 102.

The first estimate of the kinematic state of the UAV 102 may be received from another node. For example, the initial kinematic state estimate may be received from the kinematic state estimator 110. Alternatively, the method 200 may further comprise calculating the first kinematic state estimate. For example, the method 200 may be performed iteratively, such that the first estimate of the kinematic state of the UAV 102 at the first time instance is based on an estimate of the kinematic state of the UAV 102 at a previous time instance. Alternatively, for example particularly in the first iteration of the method, the first kinematic state of the UAV 102 may be initialised to one or more predetermined values, or one or more values selected at random. The skilled person will appreciate that there are many ways for calculating the initial state estimate.

In step 204, one or more measurements of a pathloss between each of the one or more base stations and the UAV at the first time instance are obtained.

The one or more measurements of a pathloss may be determined based on a plurality of received power measurements performed by the UAV on one or more signals received from each of the one or more base stations 104. The pathloss of a signal received at the UAV from a base station may be determined by subtracting a transmission power for the respective base station from the respective received power measurement (e.g. in the logarithmic domain, in dB). The received power may be measured, for example, from a reference signal transmitted by the base station, in which case the received power may be known as a reference signal received power (RSRP). Such reference signals may comprise cell-specific reference signals (CRSs) or other suitable reference signals.

The pathloss measurements may be received from the UAV 102 (e.g. if the method is performed in a base station), or from the one or more base stations 104 (e.g. if the method is performed in a node in the core network 106).

The method progresses to step 206, in which the estimate of the kinematic state of the UAV at the first time instance is re-determined based on the one or more predicted pathlosses and the one or more measurements of the pathloss.

In one example, the kinematic state of the UAV may be re-determined by inputting state estimation data comprising the one or more predicted pathlosses and the one or more measurements of the pathloss into an extended Kalman filter.

In a further example, the UAV is modelled as being in one of a plurality of movement modes at the first time instance, in which each of the plurality of movement modes is associated with a respective extended Kalman filter in a plurality of extended Kalman filters. The method may thus further comprise inputting the state estimation data into the plurality of extended Kalman filters and combining one or more outputs of the plurality of extended Kalman filters to re-determine the estimate of the kinematic state of the first UAV at the first time instance according to an interacting-multiple-model filtering process.

In either case, the state estimation data may further comprise one or more travel time measurements (e.g., round trip times) for signals transmitted between the one or more base stations and the first UAV at the first time instance and one or more predicted signal travel times for signals transmitted between the first UAV and the one or more base stations at the first time instance. The one or more predicted signal travel times are determined using the estimate of a kinematic state of the UAV at the first time instance.

The state estimation data may, additionally or alternatively, further comprise one or more measurements of a carrier frequency offset for signals transmitted between the first UAV and the one or more base stations at the first time instance, wherein the carrier frequency offset is indicative of a velocity of the first UAV and one or more predicted carrier frequency offsets for signals transmitted between the first UAV and the one or more base stations at the first time instance. The one or more predicted carrier frequency offsets are determined using the estimate of a kinematic state of the UAV at the first time instance.

Methods for re-determining the kinematic state of the UAV 102 are described in more detail below with respect to FIGS. 8-10.

The method 200 thus enables a kinematic state of a UAV to be monitored using one or more predicted pathlosses determined using one or more pathloss models developed using a machine-learning process.

Figure 3:
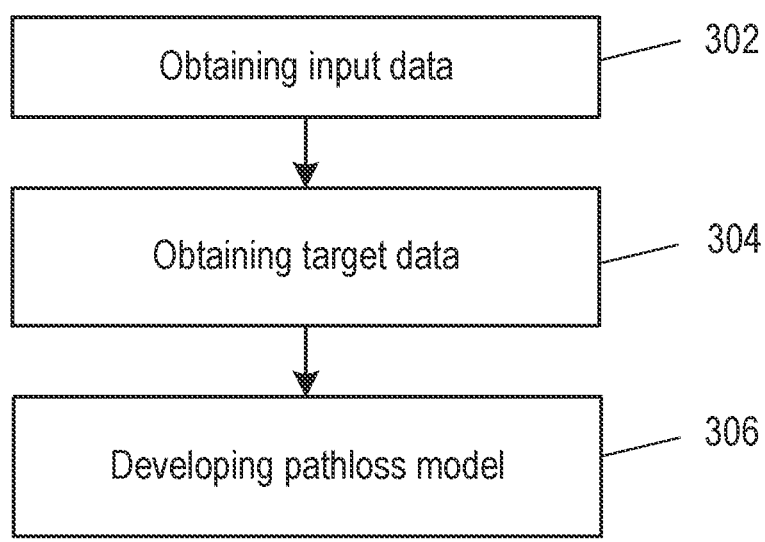
FIG. 3 is a flowchart of a method of developing a pathloss model for determining a pathloss between a UAV and a base station according to embodiments of the disclosure.

FIG. 3 is a flowchart of a method 300 for developing a pathloss model for determining a pathloss between a first UAV and a base station according to embodiments of the disclosure. The base station may be, for example, either of the base stations 104a, 104b described above in respect of FIG. 1. The method may be performed by, for example, a base station or a node in a core network (e.g. the core network 106 described above in respect of FIG. 1).

The method may begin in step 302, in which input data is obtained. The input data comprises a plurality of position measurements for one or more second UAVs. The skilled person will appreciate that, although the one or more second UAVs may comprise the first UAV, in general the one or more second UAVs need not comprise the first UAV. That is, the pathloss model may be applicable to UAVs other than the one or more second UAVs for which input data was provided.

The position measurements may comprise a distance between the at least one second UAV and the base station. Those skilled in the art will appreciate that there are many suitable methods for determining the distance between the at least one second UAV and the base station 104a. For example, the distance between the at least one second UAV and the base station 104a may be determined using one or more travel time measurements for signals transmitted between the base station 104a and the at least one second UAV (e.g. round trip time measurements).

The position measurements may, additionally or alternatively, comprise an altitude (e.g. height or elevation) of the at least one second UAV. The altitude of one of the at least one second UAV may be determined using, for example, measurements obtained by an altimeter in the respective UAV. The altitude of the at least one second UAV may be defined relative to the altitude of the base station 104a. The position measurements for the at least one second UAV may thus comprise a difference in elevation between the base station 104a and the at least one second UAV.

The position measurements may, additionally or alternatively, comprise a latitude and/or a longitude of the at least one second UAV. One or more of the altitude, latitude and longitude of the at least one second UAV may be determined using, for example, a satellite navigation system such as a global navigation satellite system (GNSS) or a regional navigation satellite system. Similar to the altitude, the latitude and/or longitude may be defined relative to the base station, such that the position measurements describe The input data may thus comprise, for example, receiving the position information for the at least one second UAVs. The position data may be received from the at least one second UAVs. For example, each of the at least one second UAVs may transmit its position information to an apparatus performing the method 300. Alternatively, the position data may be received from, for example, the base station 104a.

The input data may, additionally, comprise position measurements for the base station 104a. For example, the input data may comprise a latitude and a longitude for the base station 104a, as well as latitude and longitude measurements for each of the at least one second UAVs. In which case, the method may further comprise determining a distance between the base station 104a and the at least one second UAVs using the latitude and longitude values for the base station 104a and the at least one second UAVs. In another example, the input data comprises an altitude for the base station 104a.

Those skilled in the art will appreciate that the method may, optionally, further comprise converting the position measurements for the at least one second UAV and/or the base station 104a to an appropriate coordinate system. The method may thus comprise converting the position measurements to Earth tangential coordinates. For example, the method may comprise converting position measurements obtained from a satellite navigation system to Earth tangential coordinates.

In step 304, target data is obtained. The target data comprises a plurality of pathloss measurements for signals transmitted between the base station 104a and the at least one second UAVs, in which each of the pathloss measurements is associated with a position measurement in the plurality of positions. That is, each of the pathloss measurements is indicative of a pathloss between the base station 104a and one of the UAVs when the respective UAV is in a position indicated by the associated position measurement.

The plurality of pathloss measurements may be determined based on a plurality of received power measurements performed by the at least one second UAV. For example, each of the at least one second UAVs may measure a received power for one or more signals received from the base station 104a. The plurality of pathlosses may be determined by subtracting a transmission power for the base station 104a from the received power measurements. The received power may be measured, for example, from a reference signal transmitted by the base station 104a, in which case the received power may be known as a reference signal received power (RSRP). Such reference signals may comprise cell-specific reference signals (CRSs) or other suitable reference signals.

Alternatively, the target data may be received from another node. For example, the target data may be received from each of the at least one second UAVs (e.g. if the method is performed in the base station 104a). In another example, the target data may be received from the base station 104a (e.g. if the method is performed in a node in a core network). In either case, the plurality of pathloss measurements may be based on received power measurements performed by the at least one second UAV.

Those skilled in the art will appreciate that the order of steps 302 and 304 may be reversed such that the target data may be obtained before the input data. Alternatively, steps 302 and 304 may be performed together. For example, the input data and the target data may be received in the same message.

In step 306, a machine-learning process is used to develop the pathloss model based on the input data and the target data, for determining a pathloss between the base station 104a and a UAV. The machine-learning process may thus be any suitable supervised machine-learning process.

In particular examples, the machine-learning process is a nonlinear regression process. That is, a relationship between the input data (the position measurements, x) and the target data (the pathloss measurements, y) may be assumed to follow a pathloss function $f(x, \theta)$ with parameters $\theta = \{\theta_1, \ldots, \theta_m\}$.

In one example, the pathloss function, PL, for a pathloss between a base station 104a and a UAV is given by $$PL = \alpha_1 + b_1 \log(d),$$

where d is a distance between the base station 104a and the UAV and $\theta = \{\alpha_1, b_1\}$ are parameters of the model. This function is referred to herein as regression model 1.

In another example, the pathloss function for a pathloss between a base station 104a and a UAV is given by $$PL = \alpha_2 + b_2 \log(d) + c_2 h_m,$$

in which d is the propagation distance, $h_m$ is the UAV altitude or height and $\theta = \{\alpha_2, b_2, c_2\}$ are parameters of the model. This function is referred to as regression model 2.

Optimal parameters of the pathloss function may be determined by using a least squares process (e.g. a nonlinear least squares process). Thus, given training data D= $\{(x_1, y_1), \ldots, (x_n, y_n)\}$ comprising input data $x_{i=1 \ldots n}$ and corresponding target data $y_{i=1 \ldots n}$, the parameters $\theta=\{\theta_1, \ldots, \theta_m\}$ of a pathloss function PL(x, θ) may be determined by minimising $$l = \sum_{i=1}^{n}(y_i - PL(x_i, \theta))^2.$$

Those skilled in the art will appreciate that any suitable minimisation or optimisation process may be used in order to determine the values of the function parameters $\theta=\{\theta_1, \ldots, \theta_m\}$ that minimise l.

Accordingly, in examples using regression model 1, developing the pathloss model for a base station 104a comprises determining which parameters $\theta=\{\alpha_1, b_1\}$ minimise the square of the residuals between the target data, $y_i$, and the values returned by regression model 1, PL(d) for distance measurements, d, between the base station 104a and the at least one second UAV (e.g. the input data).

In alternative examples, the machine-learning process may be a random forest process. A plurality of decision trees and bootstrap aggregating (bagging) may thus be used to develop the pathloss model. For each decision tree in the plurality of decision trees, bootstrap aggregating is used to determine a respective subsample of the training data (e.g. the input data and the target data) for use in training that decision tree. A random selection of features is introduced in tree training, which means a set of features is randomly selected for each node split. The pathloss model may thus be developed by inputting the input data and the target data into a random forest process.

Given B decision trees, in which each decision tree provides a predicted pathloss $\hat{T}_t(x^*)$ for a subset of the input data x*, the predicted pathloss returned by a pathloss model developed using the random forest process is given by $$\hat{f}_{rf}^B = \frac{1}{B}\sum_{t=1}^{B}\hat{T}_t(x^*).$$

The method 300 may further comprise validating the pathloss model using test data for the base station 104a. That is, an accuracy of the pathloss model may be determined by comparing predictions obtained from the model with one or more pathloss measurements.

The test data may take a similar form to the data used to develop the model (e.g. the input data and the target data). For example, the pathloss model may be validated on one or more positions of a UAV and one or more pathloss measurements between the UAV and the base station 104a. The UAV may be one of the at least one second UAVs used to develop the model. Alternatively, the UAV may be a different UAV.

Model validation may be used to determine whether to further develop the pathloss model. Thus, for example, if the pathloss model returns predicted pathloss values that differ from the pathloss measurements by more than a predetermined value, then it may be determined that the pathloss model requires further development (e.g. more training data is needed).

Embodiments of the disclosure thus provide a method 300 for developing a pathloss model for determining a pathloss between a first UAV and a base station. Input data and target data for at least one second UAV are used to develop the pathloss model using a machine-learning process.

In the aforementioned description, the pathloss model is developed using input data and target data for a single base station. Thus, the pathloss model may be specific to the particular base station for which the input data and target data was obtained. Accordingly, the skilled person will appreciate that the method 300 may be performed multiple times in respect of multiple base stations, in order to develop a respective pathloss model for each of the multiple base stations. Each pathloss model may be associated with, for example, a cell ID for the respective base station.

Alternatively, the method 300 may be used to develop a pathloss model for any base station. For example, input data and training data for one or more base stations may be used to develop a single pathloss model.

The skilled person will appreciate that the pathloss model may be further developed during use. That is, the method 300 may be repeated whenever new input and target data is available (e.g. whenever a UAV connects to the base station), thereby enabling the pathloss model to be refined and updated.

Figure 4:
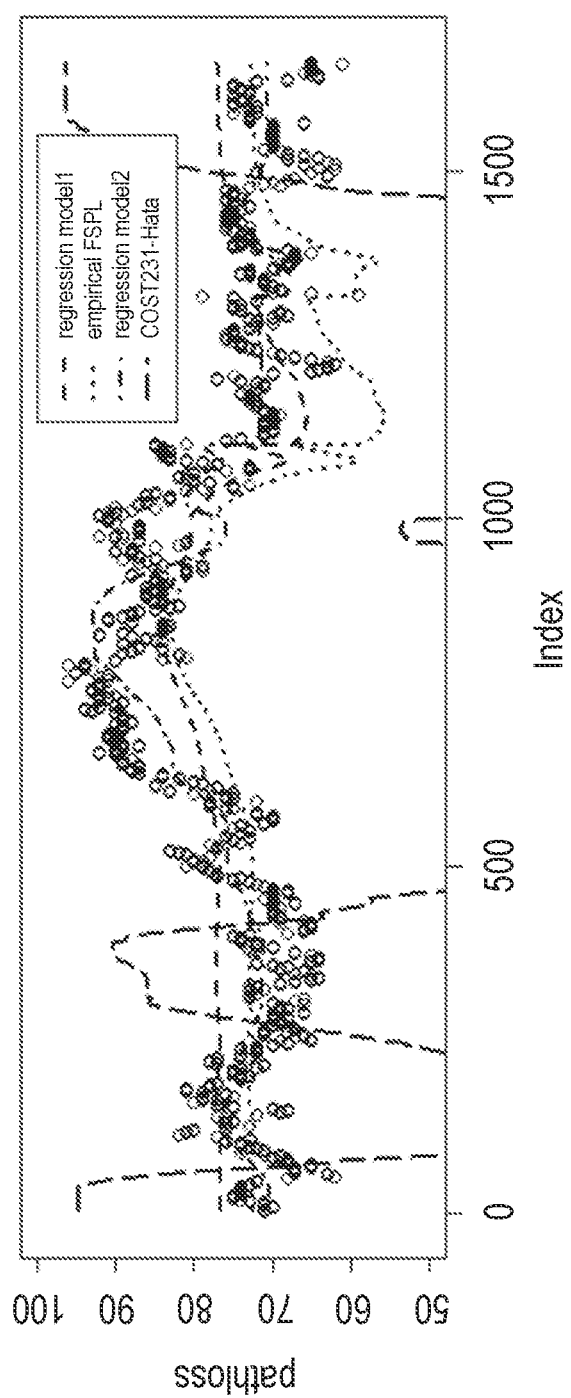
FIGS. 4, 5, 6 and 7 show predicted pathlosses between a base station and an unmanned aerial device determined using various pathloss models, with pathloss measurements between the base station and the UAV shown for comparison.
Figure 5:
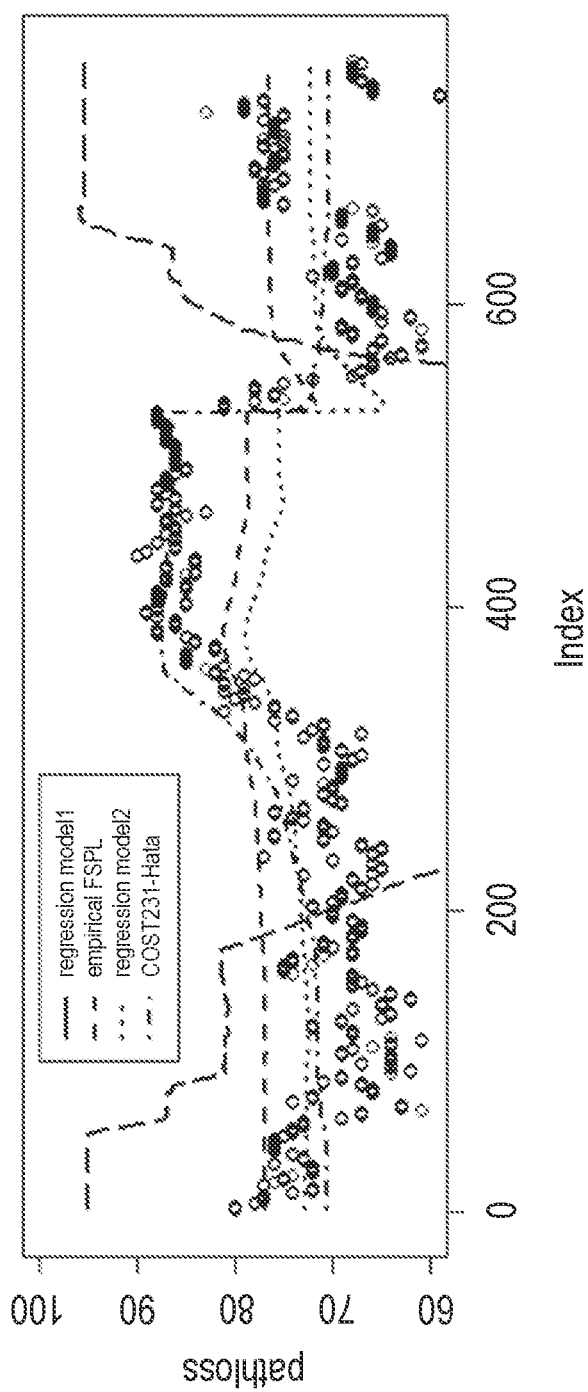

FIG. 4 and FIG. 5 show predicted pathlosses between a base station and a UAV obtained from regression model 1 and regression model 2. Measurements of pathlosses between the UAV and the base station (circles) are shown for comparison. FIG. 4 shows the data used to develop the pathloss models and FIG. 5 shows validation data used to test the developed pathloss models.

The pathloss models were developed by obtaining input data and target data, the input data comprising measurements of the latitude, longitude and altitude of the UAV and the base station respectively, and the target data comprising RSRP measurements performed by the UAV on signals transmitted by the base station and a transmit power for the base station.

One flight route was used to collect data for training the pathloss models. The training flight route was designed to include a wide variety of altitudes, speeds, shadowing and distances to the UAV. Four different flight routes were used to test the developed pathloss models. One of the flight routes using for validation (testset 4) contains measurements taken from the interior of a car which was driving in the same test area that the UAV flew in.

The position measurements for the UAV and the base station (the input data) were transformed into Earth tangential coordinates, and distances between the UAV and the base station were determined using the position measurements. Respective pathlosses were determined by subtracting the base station transmit power from the RSRP measurements.

The pathlosses and distances were input into a least-squares minimisation process in order to determine optimised parameters for the base station for regression model 1 and regression model 2. The optimised parameters obtained using a least squares algorithm for regression model 1 are:

$\alpha_1=48.63, b_1=13.41$, and the optimised parameters obtained for regression model 2 are:

$\alpha_2=75.807, b_2=5.9943, c_2=0.1861$.

Predicted pathlosses for two empirical models, a free-space pathloss (FSPL) model and a COST231-Hata model, are shown in FIGS. 4 and 5 for comparison.

The free-space pathloss model is defined as:

$$PL = 20 \log_{10}(d) + 20 \log_{10}(f) - 27.55,$$

in which d is the propagation distance in meters and f is the carrier frequency in megahertz (MHz).

The COST231-Hata model is for microwave frequencies from 150 to 1500 MHz and may be obtained by analyzing Okumura's propagation curves. According to the COST231-Hata model, the pathloss is given by:

$$PL = 46.3 + 33.9 \log_{10}(f) - 13.82 \log_{10}(h_t) - \alpha(h_r) + (44.9 - 6.55 \log_{10}(h_t)) \log_{10} d + c_m,$$

in which f is the carrier frequency in megahertz (MHz), d is the distance between a transmitter and a receiver (e.g. between the base station and the UAV) in kilometres, and $h_t$ is the transmitter antenna height in metres. The parameter $\alpha(h_r)$ is set according to the environment. For an urban environment, $\alpha(h_r)$ is defined as:

$$\alpha(h_r) = 3.20(\log_{10}(11.75 h_r))^2 - 4.97$$

in dB, in which $h_r$ is the receiver antenna height in metres. For a flat environment, $\alpha(h_r)$ is defined as $$\alpha(h_r) = (1.1 \log_{10}(f) - 0.7) h_r - (1.56 \log_{10}(f) - 0.8).$$

The parameter $c_m$ also varies with environment. For example, $c_m = 0$ dB for sub-urban and rural environments and $c_m = 3$ dB for urban environments.

It is apparent from FIGS. 4 and 5 that the predicted pathlosses obtained from the COST231-Hata model deviate significantly from the measured pathloss values (represented by circles). However, regression model 2 accurately approximates the actual pathloss values, demonstrating that more accurate pathloss estimates may be obtained by using a pathloss model developed using a machine-learning process.

Root Mean Square Error (RMSE) and Mean Absolute Error (MAE) values for the four different models (regression model 1, regression model 2, free space pathloss and COST231-Hata) for the four test flights are shown in Table 1. The RMSE values for n pathloss measurements $y_i$ and a pathloss model, PL, with parameters, e, and input data (e.g. position measurements), $x_i$ are determined using:

$$RMSE = \sqrt{\frac{\sum_{i=1}^{n}(y_i - PL(x_i, \theta))^2}{n}}.$$

The MAE values are determined using:

$$MAE = \frac{1}{n}\sum_{i=1}^{n}|y_i - PL(x_i, \theta)|.$$

As shown in Table 1, the regression model 2 outperforms the other models on the first three flight routes (testsets 1-3). For the final flight route (testset 4), which contains measurements taken from the interior of a car, the COST231-Hata model shows the best performance. However, this may be a consequence of the parameters of the COST231-Hata model being optimised for terrestrial devices (e.g. devices that are not airborne), whereas the parameters of the regression models are optimised for UAVs.

TABLE 1

| | Metric | | | |
|---|---|---|---|---|
| | Regression model 1 | Regression model 2 | FSPL model | COST231-Hata |
| | Testset 1 | | | |
| RMSE | 7.9495 | 5.2825 | 6.8213 | 49.9544 |
| MAE | 6.7396 | 4.6940 | 5.6737 | 35.1290 |
| | Testset 2 | | | |
| RMSE | 7.8346 | 5.1806 | 6.8437 | 95.0517 |
| MAE | 6.7537 | 4.3393 | 5.8482 | 63.4619 |
| | Testset 3 | | | |
| RMSE | 6.7496 | 6.2624 | 8.8047 | 145.9369 |
| MAE | 5.5181 | 4.5077 | 7.6078 | 120.9307 |
| | Testset 4: Car data | | | |
| RMSE | 21.8160 | 27.9313 | 24.8042 | 16.9536 |
| MAE | 19.6342 | 26.1155 | 23.1519 | 11.2904 |

Figure 6:
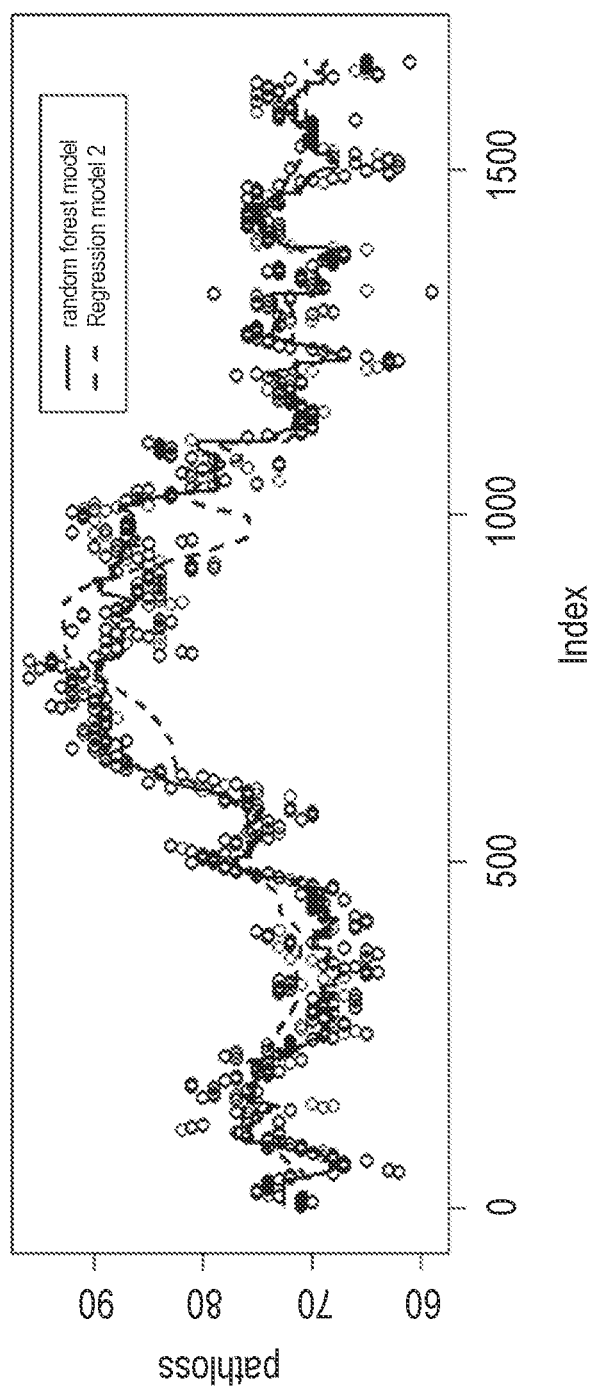
Figure 7:
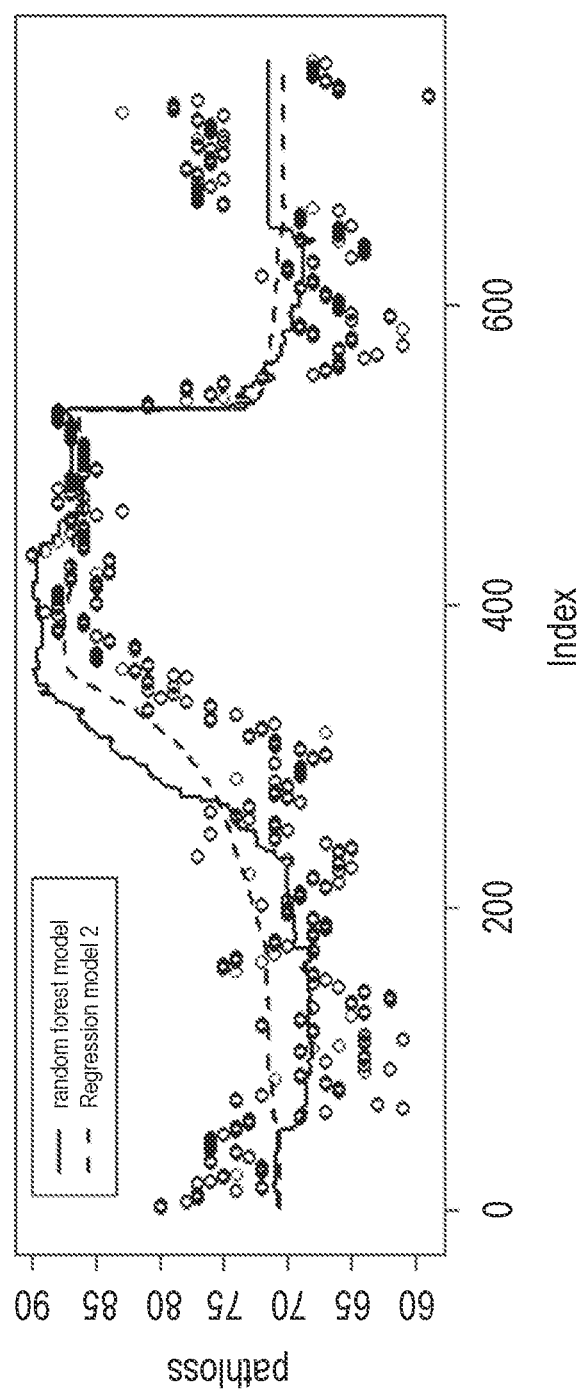

FIG. 6 and FIG. 7 are illustrations of measurements of pathlosses for signals transmitted between a UAV and a base station (circles), and predicted pathlosses obtained from regression model 2 (dashed line) and a model developed using a random forest process (solid line). FIG. 6 shows data used to train the pathloss models and FIG. 7 shows validation data used to test the developed models.

The following hyperparameters were used to train a pathloss model using a random forest process:
Number of trees to grow: 100
Number of variables randomly sampled as candidates at each split: 2
Sizes of sample to draw: 60, and
Maximum size of terminal nodes: 4.

As can be seen from FIGS. 6 and 7, both regression model 2 and the random forest model accurately predict the variations in the pathloss measurements. The RMSE and MAE for the two models are shown in Table 2. The random forest model has a slightly better performance than the regression model on testset 1, whereas both models have a similar performance on the other testsets.

TABLE 2

| | Metric | |
|---|---|---|
| | Regression model 2 | Random forest model |
| | Testset 1 | |
| RMSE | 5.2825 | 4.4029 |
| MAE | 4.6940 | 3.7186 |
| | Testset 2 | |
| RMSE | 5.1806 | 5.2696 |
| MAE | 4.3393 | 4.4178 |
| | Testset 3 | |
| RMSE | 6.2624 | 6.1737 |
| MAE | 4.5077 | 4.7964 |
| | Testset 4 | |
| RMSE | 27.9313 | 21.5359 |
| MAE | 26.1155 | 19.3746 |

By developing a pathloss model using a machine-learning process, embodiments of the present disclosure thus enable more accurate prediction of pathlosses for UAVs.

One or more pathloss models obtained by performing the methods described above in respect of FIGS. 3-7 may be used to determine predicted pathlosses between a UAV and a base station at a first time instance as part of the method 200 described above in respect of FIG. 2. The predicted pathlosses may thus be used with one or more measurements of a pathloss between each of the one or more base stations and the UAV to re-determine an estimate of the kinematic state of the UAV at the first time instance.

Figure 8:
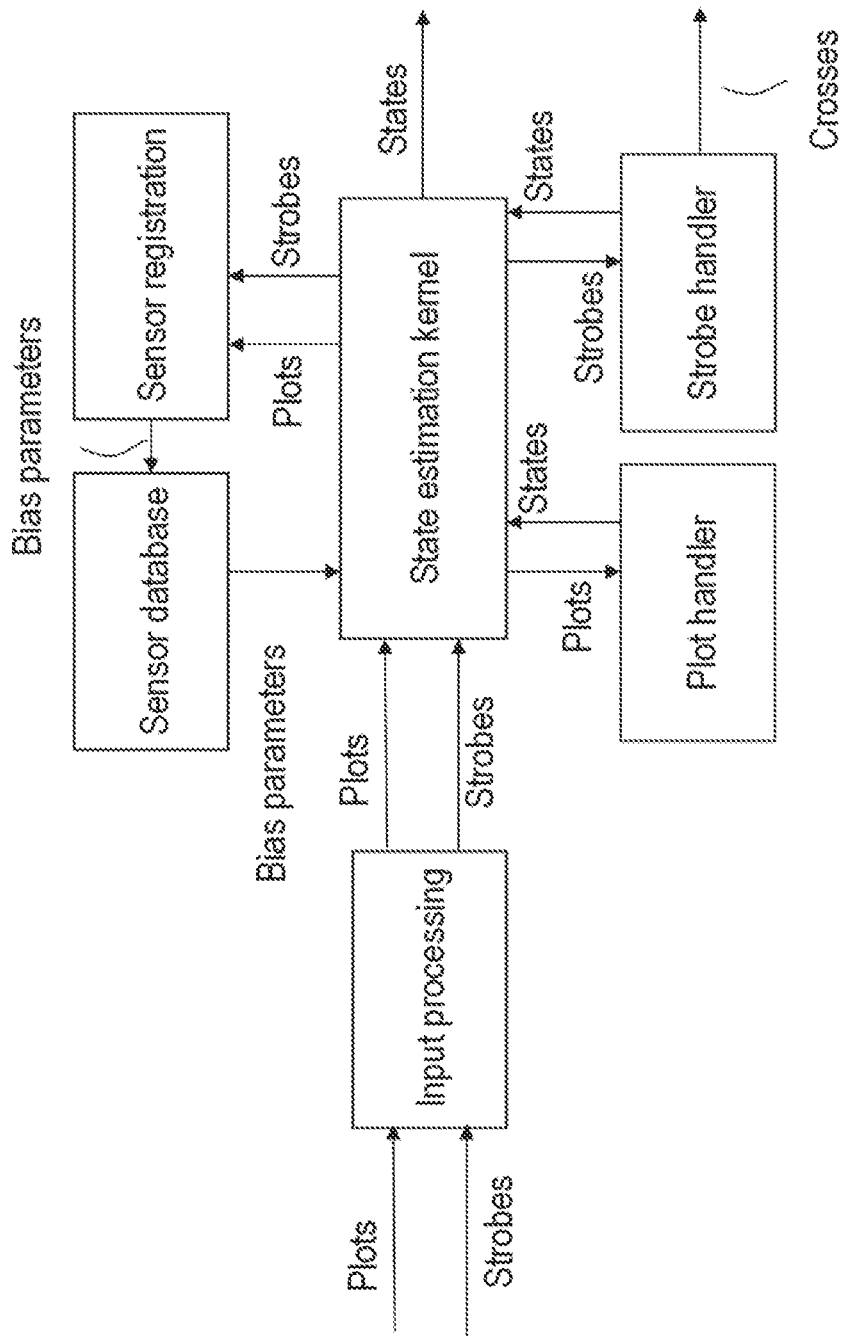
FIG. 8 is a schematic diagram of a system for estimating the kinematic state of a UAV according to embodiments of the disclosure.
Figure 9:
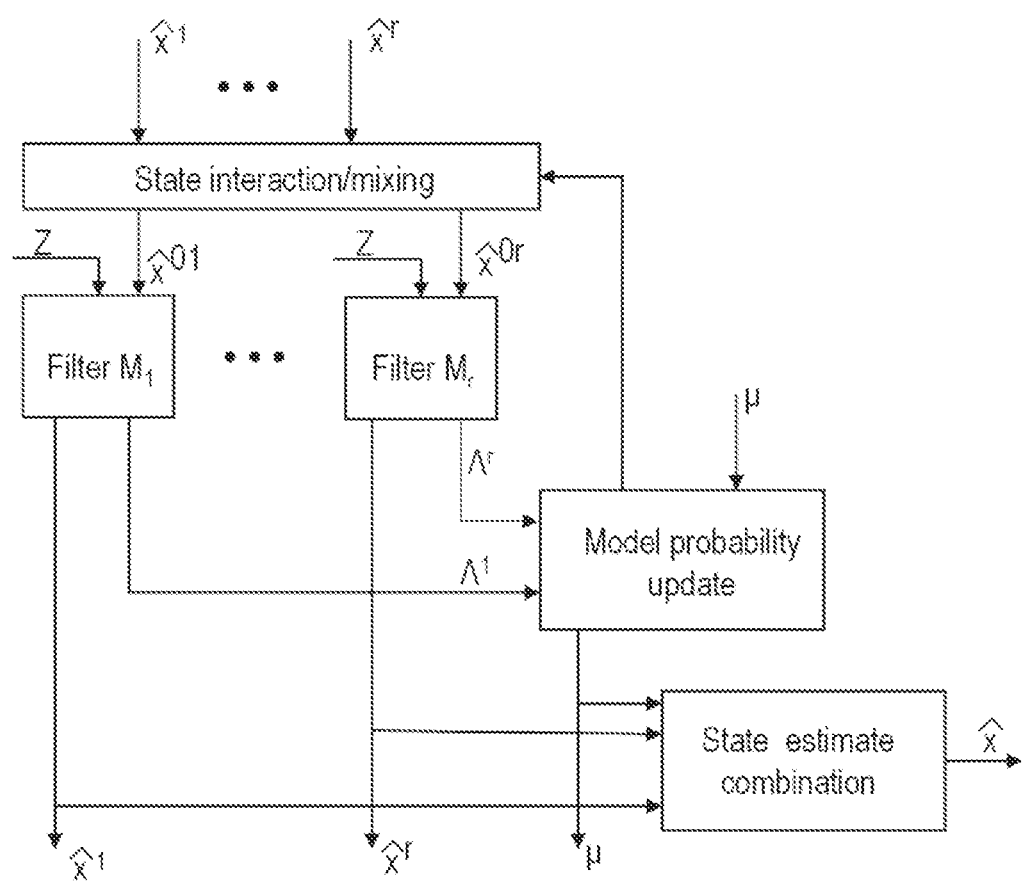
FIG. 9 is a schematic diagram of one cycle of an exemplary interacting-multiple-model filter process according to embodiments of the disclosure.
Figure 10:
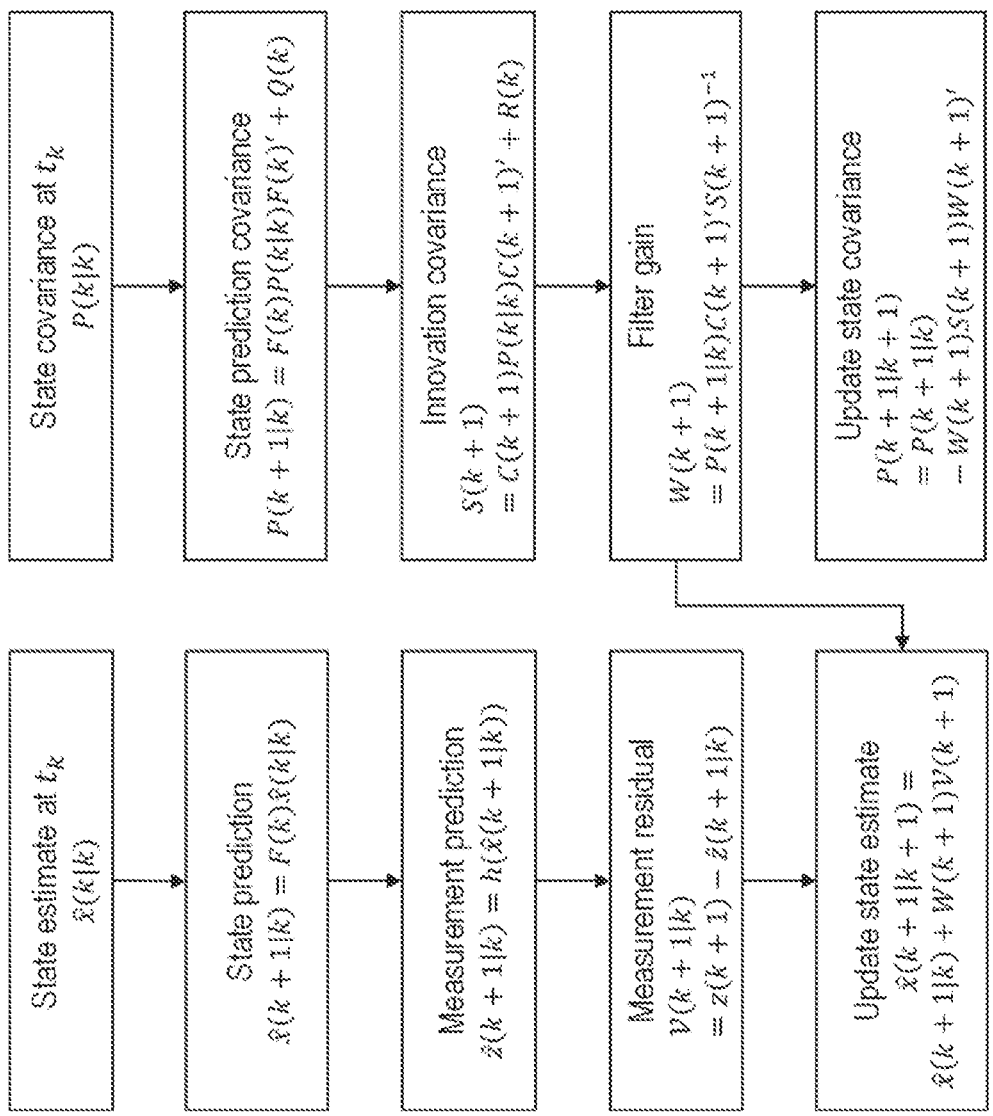
FIG. 10 a schematic diagram of an extended Kalman filter according to embodiments of the disclosure.

Methods and systems for re-determining an estimate of a kinematic state of a UAV are described in more detail in respect of FIGS. 8-10.

FIG. 8 is a schematic diagram of a state estimation system for estimating the kinematic state of a UAV according to embodiments of the disclosure. The operation of this system is briefly explained as follows. Measurements consisting of strobes and plots are collected from sensors attached to the state estimation system. Strobes are angle-only measurements and plots are Cartesian position measurements. The plots and strobes are sent to an input processing unit for association with existing three-dimensional kinematic state estimates. Association is the process of determining which sensor measurements belong to each kinematic state estimate (e.g. which sensor measurements are associated with a particular UAV).

The association is performed in the measurement space of each sensor. Thus, the state estimate, which may reside in an Earth tangential Cartesian coordinate system, may be transformed to the measurement space of each sensor. The state estimates may be updated in the measurement space of the sensor. Various methods for updating the state estimates are discussed in more detail below. Plots and strobes that are not associated with a particular kinematic state estimate may originate from new targets (e.g. different UAVs) and may be sent to the plot handler or the strobe handler for initiation of new state estimates. Plots and strobes that are associated with high quality estimates may also be used for computation of sensor bias parameters in the sensor registration block.

If such a kinematic state estimation technique is implemented in a wireless communication network (e.g. the wireless communication network 100 described above in respect of FIG. 1), some simplifications may be implemented. In a wireless communication network, each device connected to the network (e.g. each UAV) has a unique ID when attached to the network. This means that the association process described above may not be needed.

In addition, the advanced kinematic state initiation may not be needed in a wireless communication network, but the techniques may be combined with the technology presented here for further enhancement.

Thus, FIG. 8 shows an example system for monitoring a kinematic state of a UAV using data from one or more sensors to determine updates to the kinematic state of the UAV. As noted above, there are various methods for updating estimates of a kinematic state of a UAV.

In some exemplary methods, a UAV is modelled as having a plurality of possible movement modes. Thus, the UAV may, at a given instance in time, be in one of the plurality of movement modes. For example, a UAV may have a constant velocity mode (e.g. for movement along a straight line) and a manoeuvre mode (e.g. for turning). By taking into account the different movement modes of a UAV (e.g. the particular ways in which the UAV is capable of flying), more accurate kinematic state estimates for the UAV may be obtained.

One method for estimating the kinematic state of a UAV with multiple movement modes is to determine a joint probability distribution of the kinematic state of the UAV. This kinematic state estimate may be propagated forward in time using the Fokker-Planck partial differential equation. Multi-dimensional integration may be used to obtain the posterior probability kinematic state distribution from the likelihood of the measurement and the prior probability distribution (e.g. a part of a Bayesian inference process). However, this can be computationally expensive, and may be particularly memory intensive. Whilst particle filtering may be used to approximate a Bayesian interference calculation, this approach is still demanding in terms of memory and computing resources.

An alternative, simpler approach for estimating the kinematic state of a UAV involves modelling and estimating each mode separately, and then selecting a particular movement mode. For example, a UAV may be assumed to have two movement modes: a constant velocity mode (e.g. straight line movement) and a manoeuvre mode. The manoeuvre mode may be modelled by a leaky constant velocity movement that responds to measurements with higher agility than the constant velocity mode. A manoeuvre detector may be used to select a manoeuvre filter based on which filter provides a close match to any measurements. After a manoeuvre is terminated, a re-initialised constant velocity movement mode may be used for kinematic state estimation. Whilst this is a simple, robust approach, problems can arise when selecting threshold values for the manoeuvre detector.

An interactive-multiple-model (IMM) filter or process provides another alternative approach. When used to determine a kinematic state estimate for a UAV, the IMM process assumes that the UAV moves according to one of a finite number of models, which is one of several modes. The models may differ in their noise levels and/or structure. For example, models may have different state dimensions and different unknown inputs. At a time, k, the state estimate may be computed under each possible model using r filters. Each filter uses a different combination of previous model-conditioned estimates, which are referred to a mixed initial conditions.

FIG. 9 is a schematic diagram of one cycle of an exemplary IMM process for re-determining an estimate of a kinematic state of a UAV at a first time instance according to an embodiment of the present disclosure. The IMM process may be used, for example, to re-determine the estimate of the kinematic state of the UAV at the first time instance as part of the method 200 described above in respect of FIG. 2, for example. Thus, the IMM process may be used to determine the kinematic state of the UAV 102 described above in respect of FIG. 1, for example.

The IMM process comprises r interacting filters operating in parallel for r 2. The state interaction/mixing unit determines mixed initial conditions, $\hat{x}^{01} \ldots \hat{x}^{0r}$, for each of the r filters from initial state estimates $\hat{x}^1 \ldots \hat{x}^r$ for the UAV 102 at the first time instance. Mixing is performed at the input of the filters with the probabilities, and may be conditioned on state estimation data for an earlier time instance, $Z^{k-1}$. The mixed initial conditions are, together with state estimation data for the first time instance, $Z^k$, input to the r filters.

The state estimation data for the first time instance, $Z^k$, comprises one or more predicted pathlosses between a UAV 102 and one or more base stations at a first time instance, in which the predicted pathlosses are determined using an estimate of a kinematic state of the UAV 102 at the first time instance and one or more pathloss models developed using a machine-learning process. The one or more base stations may be the base stations 104 described above in respect of FIG. 1, for example. The one or more predicted pathlosses may be obtained, for example, as described above in respect of FIG. 2.

The state estimation data further comprises one or more measurements of a pathloss between each of the one or more base stations 104 and the UAV 102 at the first time instance. The one or more pathloss measurements may be obtained, for example, as described above in respect of FIG. 2.

The structure of the IMM algorithm is $$(N_e; N_f) = (r; r),$$

in which $N_e$ is the number of estimates at the start of the cycle of the algorithm and $N_f$ is the number of filters in the algorithm.

One cycle of the algorithm may comprise the following steps:

1. Calculating mixing probabilities for i, j=1, . . . , r

The probability that mode $M_i$ was in effect at time k−1, given that mode $M_j$ is in effect at time k, given state estimation data $Z^{k-1}$, is $$\mu_{i|j} = \frac{1}{\bar{c}_j} p_{ij}\mu_i(k-1).$$

The normalizing constants, $\bar{c}_j$, are given by the below equation, which uses mode transition probabilities pi. The mode transition probability, $p_{ij}$, is the probability that the UAV is in a mode j at time k, given that the UAV 102 was in a mode i at a time k−1. The expression for the normalizing constant is:

$$\bar{c}_j = \sum_{i=1}^{r} p_{ij}\mu_i(k-1).$$

2. Performing mixing for j=1, . . . ,r

Starting with PL(k−1|k−1) one components, the mixed initial condition for the filter matched to $M_j(k)$ may be written as:

$$\hat{x}^{0j}(k-1|k-1) = \sum_{i=1}^{r} \hat{x}^i(k-1|k-1)\mu_{i|j}(k-1|k-1),$$

for j=1, . . . r. The corresponding covariance is:

$$P^{0j}(k-1|k-1) =$$
$$\sum_{i=1}^{r} \mu_{i|j}(k-1|k-1)\{P^i(k-1|k-1) + [\hat{x}^i(k-1|k-1) - \hat{x}^{0j}(k-1|k-1)] \cdot$$
$$[\hat{x}^i(k-1|k-1) - \hat{x}^{0j}(k-1|k-1)]'\},$$

in which ' denotes the transpose.

3. Mode-matched filtering for j=1, . . . ,r

The estimate and the covariance obtained in step 2 are used as input to a filter matched to $M_j(k)$, which uses z(k) to yield $\hat{x}^j(k|k)$ and $P^j(k|k)$.

The likelihood function, $\Lambda_j$, corresponding each of the r filters is:

$$\Lambda_j(k) = p[z(k)|M_j(k), Z^{k-1}],$$

The likelihood functions may thus be computed using the mixed initial condition and the associated covariance:

$$\Lambda_j(k) = p[z(k)|M_j(k), \hat{x}^{0j}(k-1|k-1)P^{0j}(k-1|k-1)],$$

4. Updating the model probability for j=1, . . . ,r

The model probability is updated using:

$$\mu_j(k) = \frac{1}{c}\Lambda_j(k)\bar{c}_j,$$

in which $\bar{c}_j$ is given above and the normalization factor is:

$$c = \sum_{j=1}^{r} \Lambda_j(k)\bar{c}_j.$$

is the normalisation factor.

5. Determining the state estimate and the covariance

The model-conditioned estimates covariances are combined according to the mixture equations:

$$\hat{x}(k|k) = \sum_{j=1}^{r} \hat{x}^j(k|k)\mu_j(k), \text{ and}$$

$$P(k|k) = \sum_{j=1}^{r}\mu_j(k)\{P^j(k|k) + [\hat{x}^j(k|k) - \hat{x}(k|k)][\hat{x}^j(k|k) - \hat{x}(k|k)]'\}.$$

Three choices may be made to set up an IMM filter. First, the movement modes have to be defined. Secondly, the transition probabilities between the movement modes have to be defined. Finally, the initial conditions of the filters have to be selected.

For each movement mode, the definition of the movement modes (the first choice) amounts to the definition of a kinematic state space model, e.g., one vector difference equation that defines the dynamics, and another static vector equation that defines the measurement relation, by mapping kinematic states to the measurements. In addition, the inaccuracies of the measurement equation and the dynamic kinematic state model may be given in terms of the covariance matrices of the uncertainties.

The second choice describes, in terms of a hidden Markov model, how the modes interact. This may be expressed in terms of the probabilities of a mode transition of the estimated UAV 102, between two discrete instances of time.

The third choice may be made in terms of the expected initial kinematic state and covariance of each model.

These choices may be specific to the implementation of the IMM filter and thus may be unique for each new implementation of the IMM filter.

Any suitable filters may be used for the r filters in the IMM process, including, for example, one or more particle filters. In particular examples, a nonlinear extended Kalman Filter (EKF) may be used for each filter $M_j$ in the r filters in the IMM process. An extended Kalman Filter uses linear approximations of a nonlinear system. It can be used to estimate the kinematic state of a discrete-time dynamic system described by a vector difference equation with additive white Gaussian noise that models unpredictable disturbances.

FIG. 10 shows a schematic diagram of an extended Kalman Filter according to embodiments of the disclosure.

As noted above, one or more extended Kalman Filters may be implemented as filters in an IMM process to re-determine a kinematic state of the UAV 102 at a first time instance. State estimation data, Z, may thus be input into a plurality of extended Kalman Filters to re-determine the estimate of the kinematic state at the first time instance, in which the state estimation data comprises the one or more predicted pathlosses, $\hat{z}$, and the one or more measurements of the pathloss, z. This process is described in more detail as follows.

Using an extended Kalman Filter, the kinematic state of the UAV 102 at time k+1 is given by $$\hat{x}(k+1) = F(k)x(k) + v(k)$$

in which x(k) is an $n_x$-dimensional kinematic state vector for the UAV at time k, and v(k) is zero-mean white Gaussian process noise, which is also $n_x$-dimensional. The zero-mean white Gaussian process noise has covariance:

$$\mathbb{E}[v(k)v(k)'] = Q(k).$$

Pathloss measurements, z(k), for the UAV 102 at time k are assumed to depend on the kinematic state of the UAV 102 at time k according to:

$$z(k) = h(x(k), k) + w(k),$$

in which h is a nonlinear function of the kinematic state and w(k) is a sequence of zero-mean Gaussian measurement noise with covariance $$\mathbb{E}[w(k)w(k)'] = R(k).$$

The matrices F, Q, R and the function h(.) are assumed known and may be time varying. In other words, the system may be time varying and/or the noise may be nonstationary. The Jacobian of the measurement model h(x(k), k) with respect to k is defined as $$C(k) = \frac{\partial h(x(k), k)}{\partial x(k)}.$$

For example, for regression model 2 described above, $$h(x) = PL = \alpha_2 + b_2 \log(d) + c_2 h_m$$

where d is the distance between UAV and respective base station, defined as $$d(\hat{x}) = \sqrt{(\hat{x}_1 - x_{s,1})^2 + (\hat{x}_2 - x_{s,2})^2 + (\hat{x}_3 - x_{s,3})^2}.$$

Therefore, $$h(\hat{x}(k)) = PL(d(\hat{x}(k))) =$$
$$a_1 + a_2 \log_{10}\left(\sqrt{(\hat{x}_1 - x_{s,1})^2 + (\hat{x}_2 - x_{s,2})^2 + (\hat{x}_3 - x_{s,3})^2}\right) + a_3 \hat{x}_3,$$

And the derivative of the measurement model is defined as $$\frac{\partial h(\hat{x}(k))}{\partial \hat{x}} = \frac{\partial f}{\partial d} \frac{\partial d}{\partial \hat{x}}(k) =$$

$$\left( \begin{array}{c} \frac{a_2(\hat{x}_1(k) - x_{s,1}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]} \\ \frac{a_2(\hat{x}_2(k) - x_{s,2}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]} \\ \frac{a_2(\hat{x}_3(k) - x_{s,3}(k))}{\ln(10)\left[(\hat{x}_1(k) - x_{s,1}(k))^2 + (\hat{x}_2(k) - x_{s,2}(k))^2 + (\hat{x}_3(k) - x_{s,3}(k))^2\right]} + a_3 \end{array} \right)'.$$

The initial kinematic state x(0) of the UAV 102 may be unknown, and may be modelled as a random variable that is Gaussian-distributed with a known mean and covariance. The two noise sequences, v(k) and w(k), and the initial state may be assumed to be mutually independent. This constitutes the Linear-Gaussian (LG) assumption.

The conditional mean $$\hat{x}(j|k) = \mathbb{E}[x(j)|Z^k],$$

in which $Z^k = \{z(j), j \leq k\}$ denotes the sequence of measurements (e.g. pathloss measurements) available at time k, is an estimate of the kinematic state if j=k and a predicted value of the kinematic state if j>k. The filter may thus be used to estimate a current state of the UAV (when j=k) or predict a future state of the UAV (if j>k). The conditional covariance matrix of x(j) given the state estimation data $Z^k$ or the covariance associated with the estimate is:

$$P(j|k) = \mathbb{E}[x(j) - \hat{x}(j|k)][x(j) - \hat{x}(j|k)]'|Z^k].$$

The estimation process starts with the initial estimate $\hat{x}(0|0)$ of the initial state of the UAV, x(0), and an associated initial covariance P(0|0), which is assumed to be available. The second (conditioning) index 0 stands for $Z^0$, which is any initially available state estimation data.

One cycle of the extended Kalman Filter thus comprises computations to obtain an estimate:

$$\hat{x}(k|k) = \mathbb{E}[x(k)|Z^k],$$

which is the conditional mean of the kinematic state of the UAV 102 at time k (e.g. a first time instance) given state estimation data for time instances up to and including time k, and an associated covariance matrix $$P(k|k) = \mathbb{E}[[x(k) - \hat{x}(k|k)][x(k) - \hat{x}(k|k)]'|Z^k].$$

As described above, a plurality of extended Kalman Filters may be used as part of an IMM filter to re-determine an estimate of a kinematic state of a UAV 102 based on pathloss measurements and predicted pathlosses for the UAV 102. In which case, the state estimation data is input into each of the plurality of extended Kalman Filters in the IMM filter, and the outputs of the plurality of extended Kalman Filters are combined to re-determine the estimate of the kinematic state of the UAV 102. Thus, each extended Kalman Filter may output a respective updated state estimate and associated covariance matrix, which are combined in the IMM filter to re-determine the kinematic state of the UAV 102.

In alternative examples, only a single extended Kalman Filter may be used. In which case, re-determining the kinematic state of the UAV at the first time instance comprises inputting the state estimation data to the single extended Kalman Filter and obtaining an updated state estimate for the UAV 102 at the first instance from the extended Kalman Filter.

One or more extended Kalman Filters may thus be used to determine an estimate of a kinematic state of a UAV 102 at a first time instance, k, based on one or more measurements of a pathloss between the UAV and one or more base stations 104 at the first time instance, z(k) and associated predicted pathlosses for the UAV at the first time instance $\hat{z}(k)$.

That is, one or more predicted pathlosses and one or more pathloss measurements may be obtained as described above in respect of FIG. 2. The one or more predicted pathlosses are determined using one or more pathloss models developed using a machine learning process (e.g. as described in the method 300 described in respect of FIG. 3). The one or more predicted pathlosses and the one or more measurements of the pathloss may then be input into one or more extended Kalman Filters to re-determine the estimate of the kinematic state at the first time instance.

In particular embodiments of the disclosure, the pathloss measurements and pathloss predictions may be supplemented by additional data in order to further improve the accuracy of kinematic state estimation. That is, additional state estimation data may be used in the methods outlined above to refine the estimate of the kinematic state of the UAV 102.

In one embodiment, travel time measurements for signals transmitted between the UAV 102 and the one or more base stations 104 are used to further improve the accuracy of the kinematic state estimation.

Travel time measurements for signals transmitted between the UAV 102 and the one or more base stations 104 are indicative of a distance between the UAV 102 and the one or more base stations 104. In particular, the distance between a UAV and a base station is given by:

$$R = c\frac{RTT}{2},$$

in which c is the speed of light, and RTT is the round trip travel time. An exemplary process for measuring a round trip travel time between a base station and a UAV is described as follows. The base station transmits a first signal to the UAV at time $t_1$. The UAV receives the signal at time $t_2$ and transmits a second signal at time $t_3$. The second signal is received at the base station at time $t_4$. The round trip travel time, RTT, is thus given by:

$$RTT = t_4 - t_1 - RxTx$$

where RxTx is measured in the UAV as $$RxTx = t_3 - t_2$$

and transmitted to the base station (e.g. in a radio resource protocol, RRC, message).

The main contribution to the inaccuracy of a travel time measurement originates from the two reception processes in the UAV and the base station. The theoretical inaccuracy of one such measurement is, in free space propagation, inversely proportional to the measurement bandwidth, $\Delta f$, such that $$\Delta t \geq \frac{1}{4\pi}\frac{1}{\Delta f}$$

For example, for a measurement bandwidth of 30 MHz, the smallest achievable time inaccuracy is 2.65 nanoseconds which corresponds to approximately 1 metre. Since two independent measurement processes are used to determine a round trip time measurement, a 40 MHz measurement bandwidth would result in a combined round trip time measurement inaccuracy of approximately 1 metre.

Thus, the state estimation data used to re-determine the estimate of the kinematic state of the UAV (e.g. as described above in respect of FIGS. 9 and 10) may further comprise one or more travel time measurements for signals transmitted between the one or more base stations 104 and the UAV 102 at the first time instance. In which case, the state estimation data further comprises one or more predicted signal travel times for signals transmitted between the UAV 102 and the one or more base stations 104 at the first time instance.

The one or more predicted signal travel times are determined using the estimate of a kinematic state of the UAV 102 at the first time instance. For example, the one or more predicted signal travel times at a first time instance, k, may be determined using:

$$h(\hat{x}(k)) = \frac{2\sqrt{(\hat{x}_1(k) - x_{s,1}(k))^2 + (\hat{x}_2(k) - x_{s,2}(k))^2 + (\hat{x}_3(k) - x_{s,3}(k))^2}}{c},$$

in which $\hat{x}_i$ are position coordinates for the UAV 102 according the estimated kinematic state of the UAV, $x_s$ are position coordinates for a respective base station and c is the speed of light. If the UAV 102 is assumed to in a constant position, the derivative of the measurement model for the signal travel times is thus defined as:

$$\frac{\partial h(\hat{x}(k))}{\partial \hat{x}} = \begin{pmatrix} \frac{2(\hat{x}_1(k) - x_{s,1}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_2(k) - x_{s,2}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \\ \frac{2(\hat{x}_3(k) - x_{s,3}(k))}{c\sqrt{(\hat{x}_1(k) - x_{s,1}(k))^2 + (\hat{x}_2(k) - x_{s,2}(k))^2 + (\hat{x}_3(k) - x_{s,3}(k))^2}} \end{pmatrix}'.$$

In this example, it is assumed that the pathloss measurements are done with respect to only one base station. However, the skilled person will appreciate that additional rows would be included if pathloss measurements for additional base stations are used. In addition, the Jacobian here is for a UAV 102 that is in an approximately constant position. The skilled person will appreciate that minor modifications may be made for a UAV moving with, for example, a constant velocity or a constant acceleration.

Signal travel time measurements and predicted signal travel times for a UAV 102 may thus, in addition to pathloss measurements and predicted pathlosses for the UAV, be input into an IMM filter (e.g. as described with respect to FIG. 9) in order to re-determine an estimate of the kinematic state of the UAV 102.

Additionally or alternatively, carrier frequency offset measurements (e.g. frequency shift measurements) for signals transmitted between the UAV 102 and the one or more base stations 104 may be used to further improve the accuracy of the kinematic state estimation.

Due to the Doppler effect, any movement of the UAV 102 towards or away from a base station 104 changes the frequency of signals received at, for example, the UAV from the base station. The Doppler frequency is thus related to the speed at which the UAV 102 approaches a base station according to:

$$f_D = \frac{v}{c}f_C$$

in which $f_D$ is the Doppler frequency, v is the (departing) velocity of the UAV with respect to the base station, c is the speed of light and $f_c$ is the carrier frequency.

The skilled person will appreciate that there are many ways to obtain a carrier frequency offset measurement. For example, the Fourier transformations that are done when OFDM reception is performed in 4G and 5G cellular systems may be used. The Fourier transform pair $$e^{iw_0^t}f(t) \leftrightarrow F(j(w-w_0))$$

may be exploited in the uplink to compare the phase shift between pilot signals (e.g. on two OFDM symbols) after each other. This also allows carrier frequency offset measurements to be performed for multiple base stations.

In LTE, the Physical Uplink Control Channel, PUCCH, may be used for this purpose. In NR, PUCCH and sounding reference signals (SRSs) may be used, as up to four adjacent symbols may be scheduled as SRS in NR.

Thus, the state estimation data used to re-determine the estimate of the kinematic state of the UAV (e.g. as described above in respect of FIGS. 9 and 10) may further comprise one or more measurements of a carrier frequency offset for signals transmitted between the UAV 102 and the one or more base stations 104 at the first time instance. In which case, the state estimation data further comprises one or more predicted carrier frequency offsets for signals transmitted between the UAV 102 and the one or more base stations 104 at the first time instance.

The one or more predicted carrier frequency offsets are determined using the estimate of a kinematic state of the UAV 102 at the first time instance. For example, the one or more predicted carrier frequency offsets for signals transmitted between the UAV 102 and the one or more base stations 104 at a first time instance may be determined using:

$$h(\hat{x}) = \frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{\sqrt{(\hat{x}_1 - x_{s,1})^2 + (\hat{x}_2 - x_{s,2})^2 + (\hat{x}_3 - x_{s,3})^2}}$$

in which $\hat{x}_1, \hat{x}_2$ and $\hat{x}_3$ are estimated position coordinates for the UAV 102 based on the kinematic state estimate for the UAV 102 at the first time instance, $\hat{x}$, and $\hat{x}_4, \hat{x}_5$ and $\hat{x}_6$ are the estimated velocity coordinates for the UAV 102 based on the kinematic state estimate.

The derivative of this measurement model, $h(\hat{x})$, for carrier frequency offset with respect to a single base station is thus defined as:

$$\frac{\partial h(\hat{x})}{\partial \hat{x}} = \left(\frac{\partial h}{\partial \hat{x}_1} \frac{\partial h}{\partial \hat{x}_2} \frac{\partial h}{\partial \hat{x}_3} \frac{\partial h}{\partial \hat{x}_4} \frac{\partial h}{\partial \hat{x}_5} \frac{\partial h}{\partial \hat{x}_6} 0\ 0\ 0\right),$$

in which $$\frac{\partial h}{\partial \hat{x}_1} = \frac{f_c}{c} \frac{\hat{x}_4}{\sqrt{(\hat{x}_1 - x_{s,1})^2 + (\hat{x}_2 - x_{s,2})^2 + (\hat{x}_3 - x_{s,3})^2}} - \frac{f_c}{c} \frac{(\hat{x}_1 - x_{s,1})((\hat{x}_1 - x_{s,1})\hat{x}_4 + (\hat{x}_2 - x_{s,2})\hat{x}_5 + (\hat{x}_3 - x_{s,3})\hat{x}_6)}{((\hat{x}_1 - \hat{x}_{s,1})^2 + (\hat{x}_2 - \hat{x}_{s,2})^2 + (\hat{x}_3 - \hat{x}_{s,3})^2)^{\frac{3}{2}}},$$

$$\frac{\partial h}{\partial \hat{x}_2} = \frac{f_c}{c} \frac{\hat{x}_5}{\sqrt{(\hat{x}_1 - x_{s,1})^2 + (\hat{x}_2 - x_{s,2})^2 + (\hat{x}_3 - x_{s,3})^2}} - \frac{f_c}{c} \frac{(\hat{x}_2 - x_{s,2})((\hat{x}_1 - x_{s,1})\hat{x}_4 + (\hat{x}_2 - x_{s,2})\hat{x}_5 + (\hat{x}_3 - x_{s,3})\hat{x}_6)}{((\hat{x}_1 - x_{s,1})^2 + (\hat{x}_2 - x_{s,2})^2 + (\hat{x}_3 - x_{s,3})^2)^{\frac{3}{2}}},$$

$$\frac{\partial h}{\partial \hat{x}_3} = \frac{f_c}{c} \frac{\hat{x}_6}{\sqrt{(\hat{x}_1 - x_{s,1})^2 + (\hat{x}_2 - x_{s,2})^2 + (\hat{x}_3 - x_{s,3})^2}} -$$

$$\frac{f_c}{c} \frac{(\hat{x}_3 - x_{s,3})((\hat{x}_1 - x_{s,1})\hat{x}_4 + (\hat{x}_2 - x_{s,2})\hat{x}_5 + (\hat{x}_3 - x_{s,3})\hat{x}_6)}{((\hat{x}_1 - x_{s,1})^2 + (\hat{x}_2 - x_{s,2})^2 + (\hat{x}_3 - x_{s,3})^2)^{\frac{3}{2}}},$$

$$\frac{\partial h}{\partial \hat{x}_4} = \frac{f_c}{c} \frac{(\hat{x}_1 - x_{s,1})}{\sqrt{(\hat{x}_1 - x_{s,1})^2 + (\hat{x}_2 - x_{s,2})^2 + (\hat{x}_3 - x_{s,3})^2}},$$

$$\frac{\partial h}{\partial \hat{x}_5} = \frac{f_c}{c} \frac{(\hat{x}_2 - x_{s,2})}{\sqrt{(\hat{x}_1 - \hat{x}_{s,1})^2 + (\hat{x}_2 - \hat{x}_{s,2})^2 + (\hat{x}_3 - \hat{x}_{s,3})^2}},$$

$$\frac{\partial h}{\partial \hat{x}_6} = \frac{f_c}{c} \frac{(\hat{x}_3 - x_{s,3})}{\sqrt{(\hat{x}_1 - x_{s,1})^2 + (\hat{x}_2 - x_{s,2})^2 + (\hat{x}_3 - x_{s,3})^2}}.$$

In this example, it is assumed that the measurements are performed with respect to only one base station. However, the skilled person will appreciate that additional rows would be included for measurements relating to any additional base stations. In addition, the Jacobian here is for a UAV that is moving with an approximately constant acceleration, in which the kinematic state of the UAV is represented using three position coordinates, three velocity coordinates and three acceleration coordinates.

Thus, carrier frequency offset measurements and predicted carrier frequency offsets for a UAV may, in addition to pathloss measurements and predicted pathlosses for the UAV, be input into an IMM filter (e.g. as described with respect to FIG. 9) in order to re-determine an estimate of the kinematic state of the UAV.

As described above, using IMM filtering to determine a trajectory of a UAV assumes that the UAV moves according to one of a finite number of models, which is one of several modes. The skilled person will appreciate that there many different models that may be applied to re-determine an estimate of a kinematic state of a UAV according to embodiments of the disclosure. However, existing movement models may not be tailored for the specific capabilities of UAVs.

Embodiments of the disclosure thus provide a three-mode model that accounts for the hovering capabilities of UAVs. The UAV is modelled as being in one of a plurality of movement modes comprising a three-dimensional constant velocity movement Wiener process, a three-dimensional constant acceleration movement Wiener process, and a three-dimensional constant position Wiener process. The plurality of movement modes may thus, for example, consist of each of the aforementioned three-dimensional Wiener processes.

The three-dimensional constant velocity model is described using the kinematic states:

$$x(t) = \begin{bmatrix} x_1 \\ x_2 \\ x_3 \\ \dot{x}_1 \\ \dot{x}_2 \\ \dot{x}_3 \end{bmatrix}, \qquad (5)$$

where the subscript defines the Cartesian coordinate directions. The model is:

$$\dot{x}(t) = A_1 x(t) + B_1 \hat{v}(t), \qquad (6)$$

with $$A_1 = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}, \quad B_1 = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad (7)$$

The process noise covariance matrix is:

$$Q_{c_1} = \text{diag}([q_{11} q_{12} q_{13}]), \quad (8)$$

where $q_{11}$, $q_{12}$ and $q_{13}$ are the process noise variances.

The three-dimensional constant acceleration model is defined using the kinematic states:

$$x(t) = \begin{bmatrix} x_1 \\ x_2 \\ x_3 \\ \dot{x}_1 \\ \dot{x}_2 \\ \dot{x}_3 \\ \ddot{x}_1 \\ \ddot{x}_2 \\ \ddot{x}_3 \end{bmatrix}, \quad (9)$$

where the subscript defines the Cartesian coordinate directions. The model is:

$$\dot{x}(t) = A_2 x(t) + B_2 \hat{v}(t) \quad (10)$$

$$A_2 = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}, \quad B_2 = \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad (11)$$

The process noise covariance matrix is $Q_{c_2}$.

The three-dimensional constant position (hovering) model is defined by the kinematic states:

$$x(t) = \begin{bmatrix} x_1 \\ x_2 \\ x_3 \end{bmatrix}, \quad (12)$$

where the subscript defines the Cartesian coordinate directions. The model is:

$$\dot{x}(t) = A_3 x(t) + B_3 \hat{v}(t) \quad (13)$$

$$A_3 = \begin{bmatrix} 0 & 0 & 0 \\ 0 & 0 & 0 \\ 0 & 0 & 0 \end{bmatrix}, \quad B_3 = \begin{bmatrix} 1 & 0 & 0 \\ 0 & 1 & 0 \\ 0 & 0 & 0.001 \end{bmatrix}. \quad (14)$$

The process noise covariance is $Q_{c_3}$.

Aspects of the disclosure thus provide a three-mode movement model that takes into account the hovering capabilities of UAVs. This three-mode movement model may be used, for example, as part of an IMM process. For example, the model may be used as part of the IMM filter described above in respect of FIG. 9.

As noted above, a further consideration when implementing an IMM process is the interaction between the movement modes in a model. In further embodiments of disclosure, the physics of UAV movement are used to determine interactions between the movement modes of the three-mode model described above.

In particular, when a UAV travels at a constant velocity, it cannot stop immediately, as it must first decelerate to decrease its velocity. In terms of the three-mode model described above, the UAV thus transitions from the constant velocity mode to the constant acceleration mode, and finally to the constant position mode. Direct transmission from the constant velocity mode to the constant position mode is not possible. In embodiments of the present disclosure, this is reflected by constraints in the mode transition probability matrix of the IMM filter, namely in:

$$p_{ij} = \begin{bmatrix} p_{11} & p_{12} & p_{13} \\ p_{21} & p_{22} & p_{23} \\ p_{31} & p_{32} & p_{33} \end{bmatrix},$$

in which pij describes the probability of switching from mode i to mode j. In particular, the following restrictions may be applied:

$$p_{13} \leq \varepsilon_{13}, p_{31} \leq \varepsilon_{31},$$

in which $\varepsilon_{13}$ and $\varepsilon_{31}$ are much smaller than 1. For example, $\varepsilon_{13} = \varepsilon_{31} = 0$.

Thus, in one embodiment, the interacting-multiple-model filtering process uses a reduced switching probability between the three-dimensional constant velocity movement Wiener process and the three-dimensional constant position Wiener process. The reduced switching probability between the three-dimensional constant velocity movement Wiener process and the three-dimensional constant position Wiener process may, for example, be at least two orders of magnitude lower than for switching probabilities involving the three-dimensional constant acceleration movement Wiener process.

For the purpose of illustrating the operation and performance of embodiments of the present disclosure, the performance of a kinematic state estimator operating according to examples disclosed herein has been simulated.

Figure 11:
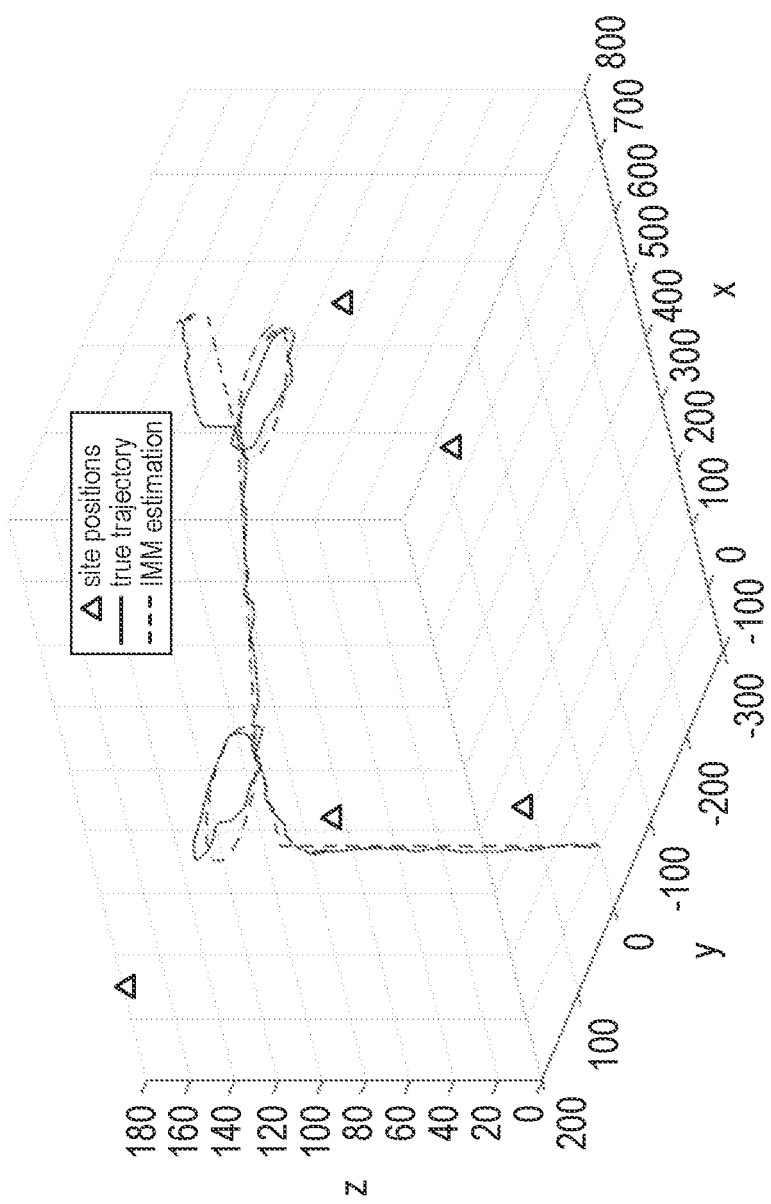
FIGS. 11 and 12 show measured trajectories and estimated trajectories of an unmanned aerial vehicle according to embodiments of the disclosure.
Figure 12:
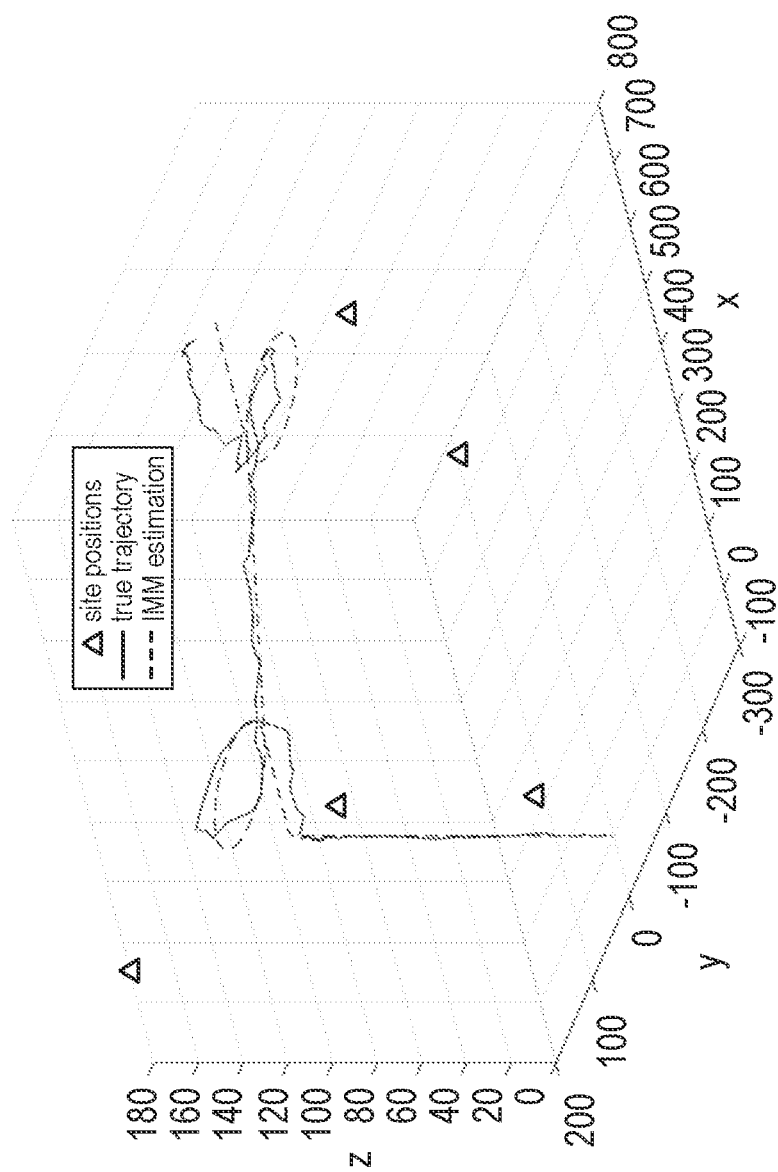

In particular, FIGS. 11 and 12 show measured trajectories and estimated trajectories for simulations of an UAV according to embodiments of the present disclosure.

The flight path of the simulated UAV is as follows:
1. The UAV starts at initial position [0, 0, 0] with the initial velocity [0, 0, 0]
2. It continues with constant acceleration (increasing velocity) for a short period, then constant speed, followed by braking, during 40 seconds upwards (mode 1)
3. It hovers for 20 seconds (mode 3)
4. The movement is followed by constant acceleration (increasing velocity), followed by constant speed, towards the right for 20 second (mode 1)
5. It does a coordinated left turn for 20 seconds (mode 2)
6. The movement is continued by constant velocity towards the right for 20 seconds (mode 1)
7. The UAV performs a coordinated right turn for 20 seconds (mode 2)

8. The UAV decreases its velocity for 20 seconds (mode 1)
9. Finally the UAV hovers for 20 seconds (mode 3).

There are five base stations, which are at the following positions:

$S_1=(200, 100, 5)'$
$S_2=(100, 40, 110)'$
$S_3=(800, -50, 70)'$
$S_4=(500, -100, 50)'$
$S_5=(50, 200, 180)'$

The simulation ran for n=180 time steps, each with a duration of T=1 second.

The kinematic state of the simulated UAV was monitored using an IMM process comprising three extended Kalman Filters, as described above in respect of FIGS. 9 and 10. At each time step, pathloss measurements, travel time measurements and carrier frequency offset measurements were obtained with respect to the UAV and the five base stations and input into the IMM process. Measurement noise variances for travel time measurements, pathloss measurements and carrier frequency offset measurements were taken to be:

$$R = \begin{bmatrix} 25^2 & 0 & 0 \\ 0 & 5^2 & 0 \\ 0 & 0 & 0.5^2 \end{bmatrix}$$

Standard deviations for the travel time measurements, pathloss measurements and carrier frequency offset measurements are 25 metres, 5 dB and 0.5 respectively. The scaling by $f_c/c$ are included by the change to speed for the carrier frequency offset measurements. The carrier frequency is selected as $f_c=800$ MHz.

Process noise variances for constant velocity, acceleration and hovering models are $q_{11}=q_{12}=q_{13}=0.1$, $q_{21}=q_{22}=q_{23=1.0}$ and $q_{31}=q_{32}=q_{33}=0.01$, respectively.

The IMM transition probability matrix is given by $$p_{ij} = \begin{bmatrix} 0.98 & 0.05 & 0.2 \\ 0.5 & 0.90 & 0.05 \\ 0.09 & 0.06 & 0.95 \end{bmatrix}$$

Initial conditions are set as:

$X_0^1=[0\ 0\ 0\ 0\ 0\ 1]'$ $P_0^1=\text{diag}([100\ 100\ 100\ 4\ 4\ 4])$ $X_0^2=[0\ 0\ 0\ 0\ 0\ 1\ 0\ 0\ 0]'$ $P_0^2=\text{diag}([100\ 100\ 100\ 4\ 4\ 4\ 1\ 1\ 1])$ $X_0^3=[0\ 0\ 0]'$ $P_0^3=\text{diag}([100\ 100\ 100])$ FIGS. 11 and 12 shows the true trajectory of the simulated UAV (solid line), a trajectory estimated using IMM filtering (dashed line), as well as the positions of the base stations (triangles).

In FIG. 12, implementations of regression model 2 are used to predict pathlosses between the UAV each of the base stations; one corresponding to each of the base stations. In FIG. 11, an estimated trajectory obtained by using a COST231-Hata model to predict pathlosses between the UAV and the base stations is shown for comparison.

As is apparent from FIGS. 11 and 12, using regression model 2 to predict pathlosses between the UAV and the one or more base stations provides more accurate estimates of the trajectory of the UAV than the COST231-Hata model.

Table 3 shows RMSE for the positions and the velocities of the UAV when the trajectory of the UAV is estimated using a model developed using a random forest process and regression model 2 for the pathloss respectively. As demonstrated by Table 3, the kinematic state estimates obtained using regression model 2 are more accurate than the kinematic state estimates obtained using a pathloss model developed using a random forest algorithm.

TABLE 3

| | Metric | |
| --- | --- | --- |
| | Random forest pathloss model | Regression model 2 |
| Position RMSE | 12.5222 | 9.9532 |
| Velocity RMSE | 0.9620 | 0.8835 |

Figure 13:
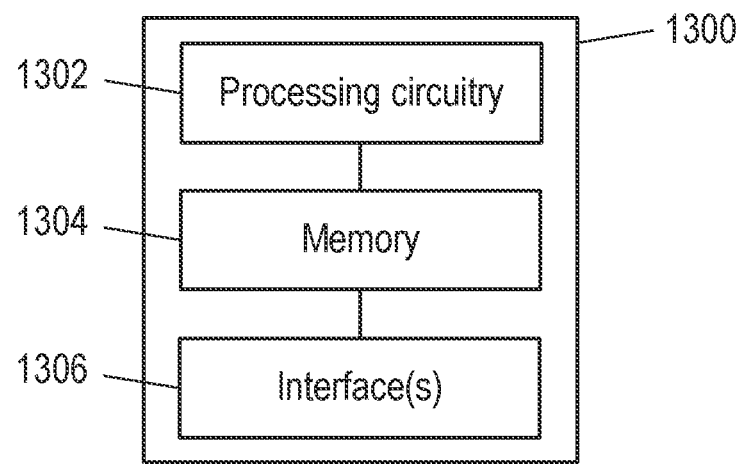
FIGS. 13 and 14 are schematic diagrams of apparatuses according to embodiments of the disclosure.

FIG. 13 is a schematic diagram of an apparatus 1300 for monitoring a kinematic state of a UAV according to embodiments of the disclosure. The apparatus 1300 may be, for example, a base station (such as either of the base stations 104a, 104b described above in respect of FIG. 1) or a node in a core network of a communications network or connected to such a core network (such as the core network 106 described above in respect of FIG. 1). For example, the apparatus 1300 may be the kinematic state estimator 110 described above in respect of FIG. 1, or a combination of the kinematic state estimator 110 and the pathloss modeller 108.

The apparatus 1300 comprises processing circuitry (or logic) 1302. The processing circuitry 1302 controls the operation of the apparatus 1300 and can implement the method 200 described above with respect to FIG. 2, for example. The processing circuitry 1302 can comprise one or more processors, processing units, multi-core processors or modules that are configured or programmed to control the apparatus in the manner described herein.

In particular implementations, the processing circuitry 1302 can comprise a plurality of software and/or hardware modules that are each configured to perform, or are for performing, individual or multiple steps of the method described herein in relation to the apparatus 1300.

Briefly, the processing circuitry 1302 of the apparatus 1300 is operable to: obtain one or more predicted pathlosses between a UAV and one or more base stations at a first time instance, wherein the predicted pathlosses are determined using an estimate of a kinematic state of the UAV at the first time instance and one or more pathloss models developed using a machine-learning process; obtain one or more measurements of a pathloss between each of the one or more base stations and the UAV at the first time instance; and re-determine the estimate of the kinematic state of the UAV at the first time instance based on the one or more predicted pathlosses and the one or more measurements of the pathloss.

Optionally, the apparatus 1300 may comprise a machine-readable storage medium (e.g. a memory) 1304. In some examples, the memory 1304 of the apparatus 1300 can be configured to store instructions (e.g. program code) that can be executed by the processing circuitry 1302 of the apparatus 1300 to perform the method described herein in relation to the apparatus 1300. Alternatively or in addition, the memory 1304 of the apparatus 1300, can be configured to store any requests, resources, information, data, signals, or similar that are described herein. The processing circuitry 1302 of the apparatus 1300 may be configured to control the memory 1304 of the apparatus 1300 to store any requests, resources, information, data, signals, or similar that are described herein.

In some examples, the apparatus 1300 may optionally comprise a communications interface 1306. The communications interface 1306 of the apparatus 1300 can be for use in communicating with other nodes, such as other virtual nodes. For example, the communications interface 1306 of the apparatus 1300 can be configured to transmit to and/or receive from other nodes requests, resources, information, data, signals, or similar.

The processing circuitry 1302 of the apparatus 1300 may be configured to control the communications interface 1306 of the apparatus 1300 to transmit to and/or receive from other nodes requests, resources, information, data, signals, or similar.

In the illustrated embodiment, the processing circuitry 1302, the machine-readable medium 1304 and the interfaces 1306 are operatively coupled to each other in series. In other embodiments, these components may be coupled to each other in a different fashion, either directly or indirectly. For example, the components may be coupled to each other via a system bus or other communication line.

Figure 14:
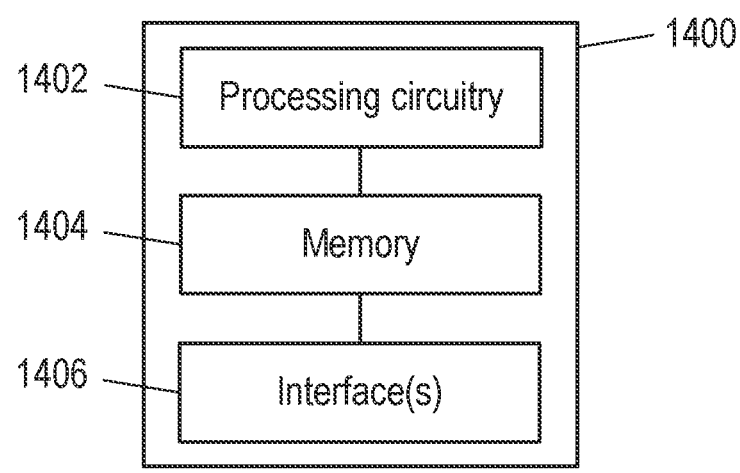

FIG. 14 shows a schematic diagram of an apparatus 1400 for developing a pathloss model for determining a pathloss between an unmanned aerial vehicle (UAV) and a base station according to embodiments of the disclosure. The apparatus 1400 may be, for example, a base station (e.g. the base station that the pathloss model is for) or a node in a core network of a communications network or connected to such a core network (such as the core network 106 described above in respect of FIG. 1). For example, the apparatus 1300 may be the pathloss modeller 108 described above in respect of FIG. 1.

The apparatus 1400 comprises processing circuitry (or logic) 1402. The processing circuitry 1402 controls the operation of the apparatus 1400 and can implement the method 300 described above with respect to FIG. 3, for example. The processing circuitry 1402 can comprise one or more processors, processing units, multi-core processors or modules that are configured or programmed to control the apparatus in the manner described herein.

In particular implementations, the processing circuitry 1402 can comprise a plurality of software and/or hardware modules that are each configured to perform, or are for performing, individual or multiple steps of the method described herein in relation to the apparatus 1400.

Briefly, the processing circuitry 1402 of the apparatus 1400 is operable to: obtain input data comprising a plurality of position measurements for one or more UAVs; obtain target data comprising a plurality of pathloss measurements for signals transmitted between the base station and the one or more UAVs, each of the pathloss measurements being associated with a position measurement in the plurality of positions; and use a machine-learning process to develop the pathloss model based on the input data and the target data, for determining a pathloss between the base station and a UAV.

Optionally, the apparatus 1400 may comprise a machine-readable storage medium (e.g. a memory) 1404. In some examples, the memory 1404 of the apparatus 1400 can be configured to store instructions (e.g. program code) that can be executed by the processing circuitry 1402 of the apparatus 1400 to perform the method described herein in relation to the apparatus 1400. Alternatively or in addition, the memory 1404 of the apparatus 1400, can be configured to store any requests, resources, information, data, signals, or similar that are described herein. The processing circuitry 1402 of the apparatus 1400 may be configured to control the memory 1404 of the apparatus 1400 to store any requests, resources, information, data, signals, or similar that are described herein.

In some examples, the apparatus 1400 may optionally comprise a communications interface 1406. The communications interface 1406 of the apparatus 1400 can be for use in communicating with other nodes, such as other virtual nodes. For example, the communications interface 1406 of the apparatus 1400 can be configured to transmit to and/or receive from other nodes requests, resources, information, data, signals, or similar. The processing circuitry 1402 of the apparatus 1400 may be configured to control the communications interface 1406 of the apparatus 1400 to transmit to and/or receive from other nodes requests, resources, information, data, signals, or similar.

In the illustrated embodiment, the processing circuitry 1402, the machine-readable medium 1404 and the interfaces 1406 are operatively coupled to each other in series. In other embodiments, these components may be coupled to each other in a different fashion, either directly or indirectly. For example, the components may be coupled to each other via a system bus or other communication line.

Embodiments of the disclosure thus provide methods, apparatus and machine-readable mediums for accurately and efficiently estimating a kinematic state of a UAV using one or more predicted pathloss between the UAV and one or more base stations, in which the predicted pathlosses are determined using one or more pathloss models developed using a machine-learning algorithm. Once trained, the pathloss models may require fewer computational resources to implement, which enables obtaining accurate pathloss estimates more efficiently. By using pathloss models developed using a machine learning process for kinematic state estimation, the trajectory of a UAV may be monitored more accurately and efficiently.

It should be noted that the above-mentioned examples illustrate rather than limit the disclosure, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of monitoring a kinematic state of an unmanned aerial vehicle, UAV, the method comprising:
   obtaining one or more predicted pathlosses between a UAV and one or more base stations at a first time instance, wherein the predicted pathlosses are determined using an estimate of a kinematic state of the UAV at the first time instance and one or more pathloss models developed using a machine-learning process;

obtaining one or more measurements of a pathloss between each of the one or more base stations and the UAV at the first time instance; and re-determining the estimate of the kinematic state of the UAV at the first time instance based on the one or more predicted pathlosses and the one or more measurements of the pathloss.

2. The method of claim 1, wherein each of the one or more pathloss models corresponds to a respective base station of the one or more base stations.

3. The method of claim 2, wherein the UAV is a first UAV and each of the one or more pathloss models is developed using training data for its respective base station, the training data comprising:
   a plurality of position measurements for at least one second UAV, and
   a plurality of pathloss measurements of at least one pathloss between the at least one second UAV and the respective base station, each of the plurality of pathloss measurements being associated with a respective position measurement in the plurality of position measurements.

4. The method of claim 3, wherein each of the plurality of position measurements comprise one or more of the following:
   a distance between the at least one second UAV and the respective base station;
   an altitude of the at least one second UAV; and
   latitude and longitude of the at least one second UAV.

5. The method of claim 3, wherein obtaining the one or more predicted pathlosses comprises:
   obtaining the estimate of the kinematic state of the first UAV at the first time instance; and
   inputting the estimate of the kinematic state of the first UAV at the first time instance into the one or more pathloss models to determine the one or more predicted pathlosses.

6. The method of claim 3, wherein the one or more measurements of the pathloss between the one or more base stations and the first UAV comprise one or more measurements performed by the first UAV on one or more signals transmitted by the one or more base stations.

7. The method of claim 3, wherein re-determining the estimate of the kinematic state of the first UAV at the first time instance comprises:
   inputting state estimation data into an extended Kalman filter, to re-determine the estimate of the kinematic state at the first time instance, the state estimation data comprising the one or more predicted pathlosses and the one or more measurements of the pathloss.

8. The method of claim 7, wherein the first UAV is modelled as being in one of a plurality of movement modes at the first time instance, each of the plurality of movement modes being associated with a respective extended Kalman filter in a plurality of extended Kalman filters, the method comprising:
   inputting the state estimation data into the plurality of extended Kalman filters; and
   combining one or more outputs of the plurality of extended Kalman filters to re-determine the estimate of the kinematic state of the first UAV at the first time instance according to an interacting-multiple-model filtering process.

9. The method of claim 8, wherein the plurality of movement modes comprise one or more of the following:
   a three-dimensional constant velocity movement Wiener process;
   a three-dimensional constant acceleration movement Wiener process; and
   a three-dimensional constant position Wiener process.

10. The method of claim 7, wherein the state estimation data further comprises:
    one or more travel time measurements for signals transmitted between the one or more base stations and the first UAV at the first time instance; and
    one or more predicted signal travel times for signals transmitted between the first UAV and the one or more base stations at the first time instance, wherein the one or more predicted signal travel times are determined using the estimate of a kinematic state of the first UAV at the first time instance.

11. The method of claim 7, wherein the state estimation data further comprises:
    one or more measurements of a carrier frequency offset for signals transmitted between the first UAV and the one or more base stations at the first time instance, wherein the carrier frequency offset is indicative of a velocity of the first UAV; and
    one or more predicted carrier frequency offsets for signals transmitted between the first UAV and the one or more base stations at the first time instance, wherein the one or more predicted carrier frequency offsets are determined using the estimate of a kinematic state of the first UAV at the first time instance.

12. The method of claim 3, comprising:
    performing said method for the first UAV at each of a plurality of time instances to monitor a trajectory of the first UAV.

13. The method of claim 1, wherein the machine-learning process is a random-forest process or a least-squares process.

14. An apparatus configured to monitor a kinematic state of an unmanned aerial vehicle, UAV, the apparatus comprising:
    processing circuitry;
    memory coupled with the processing circuitry, wherein the memory includes instructions that when executed by the processing circuitry causes the apparatus to perform operations comprising:
    obtain one or more predicted pathlosses between a UAV and one or more base stations at a first time instance, wherein the predicted pathlosses are determined using an estimate of a kinematic state of the UAV at the first time instance and one or more pathloss models developed using a machine-learning process;
    obtain one or more measurements of a pathloss between each of the one or more base stations and the UAV at the first time instance; and
    re-determine the estimate of the kinematic state of the UAV at the first time instance based on the one or more predicted pathlosses and the one or more measurements of the pathloss.

15. The apparatus of claim 14, wherein each of the one or more pathloss models corresponds to a respective base station of the one or more base stations.

16. The apparatus according to claim 15, wherein the UAV is a first UAV and each of the one or more pathloss models is developed using training data for the one or more respective base stations corresponding to the one or more pathloss models, the training data comprising:
    a plurality of position measurements for at least one second UAV, and
    a plurality of pathloss measurements of at least one pathloss between the at least one second UAV and the respective base station, each of the plurality of pathloss measurements being associated with a respective position measurement in the plurality of position measurements.

17. The apparatus according to claim 16, wherein obtaining the one or more predicted pathlosses comprises:
obtaining the estimate of the kinematic state of the first UAV at the first time instance; and inputting the estimate of the kinematic state of the first UAV at the first time instance into the one or more pathloss models to determine the one or more predicted pathlosses.

18. The apparatus according to claim 14 further comprising a computer program, wherein the computer program is contained on a carrier comprising a non-transitory storage medium and the carrier comprises one of an electronic signal, optical signal, radio signal or machine-readable storage medium.

19. The computer program according to claim 18, wherein the computer program is stored on a computer program product comprising non-transitory machine-readable media.

* * * * *